United States Patent
Ell

(10) Patent No.: US 12,129,559 B2
(45) Date of Patent: Oct. 29, 2024

(54) TEST STATION ASSEMBLIES FOR MONITORING CATHODIC PROTECTION OF STRUCTURES AND RELATED METHODS

(71) Applicant: MARATHON PETROLEUM COMPANY LP, Findlay, OH (US)

(72) Inventor: Ryan Grant Ell, Findlay, OH (US)

(73) Assignee: MARATHON PETROLEUM COMPANY LP, Findlay, OH (US)

(*) Notice: Subject to any disclaimer, the term of this patent is extended or adjusted under 35 U.S.C. 154(b) by 0 days.

(21) Appl. No.: 18/232,862

(22) Filed: Aug. 11, 2023

(65) Prior Publication Data

US 2023/0383417 A1 Nov. 30, 2023

Related U.S. Application Data

(60) Continuation-in-part of application No. 17/886,178, filed on Aug. 11, 2022, now Pat. No. 11,807,945,
(Continued)

(51) Int. Cl.
*C23F 13/22* (2006.01)
*G01N 17/04* (2006.01)

(52) U.S. Cl.
CPC .......... *C23F 13/22* (2013.01); *G01N 17/046* (2013.01)

(58) Field of Classification Search
CPC .............. G01N 17/046; H01R 9/2666; H01R 2201/20; H01R 13/44; C12F 23/22
See application file for complete search history.

(56) References Cited

U.S. PATENT DOCUMENTS 2,626,627 A 1/1953 Jung et al.
2,864,252 A 12/1958 Schaschl
(Continued)

FOREIGN PATENT DOCUMENTS

AU 2010241217 11/2010
AU 2013202839 5/2014
(Continued)

OTHER PUBLICATIONS

Masterduct, "Case Studies: High temp marine grade ship engine exhaust fume hose", retrieved at https://www.masterduct.com/CaseStudies/Hightempshipengineexhaustfumehose.aspx.
(Continued)

*Primary Examiner* — Jeff W Natalini
(74) *Attorney, Agent, or Firm* — Womble Bond Dickinson (US) LLP

(57) ABSTRACT

A test station assembly for monitoring a cathodic protection system of a buried or submerged structure includes a housing including an inner chamber a connector, and an opening. In addition, the test station assembly includes a pole to connect to the connector such that an electrical conductor extending through the pole and connected to a coupon assembly is configured enter into the inner chamber. Further, the test station assembly includes a face plate to attach to the housing to at least partially cover the opening and an electrically conductive test post to connect to the face plate. Still further, the test station assembly includes a cap to cover the test post outside of the inner chamber. The cap includes an internal passage to receive the test post therein, and an opening into the internal passage to receive a probe of a voltmeter therethrough to contact the test post.

19 Claims, 10 Drawing Sheets

Related U.S. Application Data which is a division of application No. 17/805,801, filed on Jun. 7, 2022, now Pat. No. 11,447,877.

(60) Provisional application No. 63/513,391, filed on Jul. 13, 2023, provisional application No. 63/466,062, filed on May 12, 2023, provisional application No. 63/466,056, filed on May 12, 2023, provisional application No. 63/365,102, filed on May 20, 2022, provisional application No. 63/260,622, filed on Aug. 26, 2021.

(56) References Cited

U.S. PATENT DOCUMENTS

| | | |
|---|---|---|
| 3,087,311 A | 4/1963 | Rousseau |
| 3,303,525 A | 2/1967 | Peoples |
| 3,398,071 A | 8/1968 | Bagno |
| 3,504,686 A | 4/1970 | Cooper et al. |
| 3,593,555 A | 7/1971 | Grosko |
| 3,608,869 A | 9/1971 | Woodle |
| 3,672,180 A | 6/1972 | Davis |
| 3,725,669 A | 4/1973 | Tatum |
| 3,807,433 A | 4/1974 | Byrd |
| 3,809,113 A | 5/1974 | Grove |
| 3,925,592 A | 12/1975 | Webb |
| 3,961,493 A | 6/1976 | Nolan, Jr |
| 4,010,779 A | 3/1977 | Pollock et al. |
| 4,073,303 A | 2/1978 | Foley, Jr. |
| 4,109,677 A | 8/1978 | Burnside |
| 4,202,351 A | 5/1980 | Biche |
| 4,229,064 A | 10/1980 | Vetter et al. |
| 4,242,533 A | 12/1980 | Cott |
| 4,289,163 A | 9/1981 | Pierson |
| 4,294,378 A | 10/1981 | Rabinovich |
| 4,320,775 A | 3/1982 | Stirling et al. |
| 4,357,576 A | 11/1982 | Hickam et al. |
| 4,420,008 A | 12/1983 | Shu |
| 4,457,037 A | 7/1984 | Rylander |
| 4,481,474 A | 11/1984 | Gerrit |
| 4,488,570 A | 12/1984 | Jiskoot |
| 4,630,685 A | 12/1986 | Huck et al. |
| 4,690,587 A | 9/1987 | Petter |
| 4,744,305 A | 5/1988 | Lim et al. |
| 4,788,093 A | 11/1988 | Murata et al. |
| 4,794,331 A | 12/1988 | Schweitzer, Jr. |
| 4,848,082 A | 7/1989 | Takahashi |
| 4,897,226 A | 1/1990 | Hoyle et al. |
| 4,904,932 A | 2/1990 | Schweitzer, Jr. |
| 4,964,732 A | 10/1990 | Cadeo et al. |
| 5,050,064 A | 9/1991 | Mayhew |
| 5,095,977 A | 3/1992 | Ford |
| 5,129,432 A | 7/1992 | Dugger |
| 5,191,537 A | 3/1993 | Edge |
| 5,305,631 A | 4/1994 | Whited |
| 5,367,882 A | 11/1994 | Lievens et al. |
| 5,383,243 A | 1/1995 | Thacker |
| 5,469,830 A | 11/1995 | Gonzalez |
| 5,533,912 A * | 7/1996 | Fillinger ............ H01R 13/5213 439/718 |
| 5,562,133 A | 10/1996 | Mitchell |
| 5,595,709 A | 1/1997 | Klemp |
| 5,603,360 A | 2/1997 | Teel |
| 5,627,749 A | 5/1997 | Waterman et al. |
| 5,661,623 A | 8/1997 | McDonald |
| 5,783,916 A | 7/1998 | Blackburn |
| 5,814,982 A | 9/1998 | Thompson et al. |
| 5,832,967 A | 11/1998 | Andersson |
| 5,873,916 A | 2/1999 | Cemenska et al. |
| 5,887,974 A | 3/1999 | Pozniak |
| 5,895,347 A | 4/1999 | Doyle |
| 5,906,648 A | 5/1999 | Zoratti et al. |
| 5,906,877 A | 5/1999 | Popper et al. |
| 5,939,166 A | 8/1999 | Cheng et al. |
| 5,962,774 A | 10/1999 | Mowry |
| 5,973,593 A | 10/1999 | Botella |
| 5,993,054 A | 11/1999 | Tan et al. |
| 6,022,421 A | 2/2000 | Bath |
| 6,050,844 A * | 4/2000 | Johnson ................ H01R 4/26 439/415 |
| 6,065,903 A | 5/2000 | Doyle |
| 6,077,340 A | 6/2000 | Doyle |
| 6,077,418 A | 6/2000 | Iseri et al. |
| 6,098,601 A | 8/2000 | Reddy |
| 6,111,021 A | 8/2000 | Nakahama et al. |
| 6,149,351 A | 11/2000 | Doyle |
| 6,186,193 B1 | 2/2001 | Phallen et al. |
| 6,243,483 B1 | 6/2001 | Petrou et al. |
| 6,328,877 B1 | 12/2001 | Bushman |
| 6,333,374 B1 | 12/2001 | Chen |
| 6,346,813 B1 | 2/2002 | Kleinberg |
| 6,383,237 B1 | 5/2002 | Langer et al. |
| 6,427,384 B1 | 8/2002 | Davis, Jr. |
| 6,478,353 B1 | 11/2002 | Barrozo |
| 6,679,302 B1 | 1/2004 | Mattingly et al. |
| 6,719,921 B2 | 4/2004 | Steinberger et al. |
| 6,799,883 B1 | 10/2004 | Urquhart et al. |
| 6,834,531 B2 | 12/2004 | Rust |
| 6,840,292 B2 | 1/2005 | Hart et al. |
| 6,851,916 B2 | 2/2005 | Schmidt |
| 6,980,647 B1 | 12/2005 | Daugherty et al. |
| 6,987,877 B2 | 1/2006 | Paz-Pujalt et al. |
| 7,032,629 B1 | 4/2006 | Mattingly et al. |
| 7,091,421 B2 | 8/2006 | Kukita et al. |
| 7,186,321 B2 | 3/2007 | Benham |
| 7,258,710 B2 | 8/2007 | Caro et al. |
| 7,275,366 B2 | 10/2007 | Powell et al. |
| 7,294,913 B2 | 11/2007 | Fischer et al. |
| 7,385,681 B2 | 6/2008 | Ninomiya et al. |
| 7,444,996 B2 | 11/2008 | Potier |
| 7,459,067 B2 | 12/2008 | Dunn et al. |
| 7,564,540 B2 | 7/2009 | Paulson |
| 7,631,671 B2 | 12/2009 | Mattingly et al. |
| 7,729,561 B1 | 6/2010 | Boland et al. |
| 7,749,308 B2 | 7/2010 | McCully |
| 7,810,988 B2 | 10/2010 | Kamimura et al. |
| 7,815,744 B2 | 10/2010 | Abney et al. |
| 7,832,338 B2 | 11/2010 | Caro et al. |
| 7,879,204 B2 | 2/2011 | Funahashi |
| 8,075,651 B2 | 12/2011 | Caro et al. |
| 8,282,265 B2 | 10/2012 | Breithhaupt |
| 8,299,811 B2 | 10/2012 | Wing |
| 8,312,584 B2 | 11/2012 | Hodde |
| 8,327,631 B2 | 12/2012 | Caro et al. |
| 8,368,405 B2 | 2/2013 | Siebens |
| 8,376,432 B1 | 2/2013 | Halger et al. |
| 8,402,746 B2 | 3/2013 | Powell et al. |
| 8,413,484 B2 | 4/2013 | Lubkowitz |
| 8,414,781 B2 | 4/2013 | Berard |
| 8,577,518 B2 | 11/2013 | Linden et al. |
| 8,597,380 B2 | 12/2013 | Buchanan |
| 8,616,760 B2 | 12/2013 | Williams et al. |
| 8,632,359 B2 * | 1/2014 | Grimm ............... H01R 9/2425 439/564 |
| 8,647,162 B2 | 2/2014 | Henriksson et al. |
| 8,748,677 B2 | 6/2014 | Buchanan |
| 8,808,415 B2 | 8/2014 | Caro et al. |
| 8,979,982 B2 | 3/2015 | Jordan et al. |
| 9,038,855 B2 | 5/2015 | Lurcott et al. |
| 9,162,944 B2 | 10/2015 | Bennett et al. |
| 9,175,235 B2 | 11/2015 | Kastner |
| 9,222,480 B2 | 12/2015 | Younes et al. |
| 9,310,016 B2 | 4/2016 | Hodde |
| 9,329,066 B2 | 5/2016 | Skarping |
| 9,363,462 B2 | 6/2016 | Yoel |
| 9,388,350 B2 | 7/2016 | Buchanan |
| 9,518,693 B2 | 12/2016 | Hodde |
| 9,550,247 B2 | 1/2017 | Smith |
| 9,643,135 B1 | 5/2017 | Mazzei et al. |
| 9,945,333 B2 | 4/2018 | Kopinsky |
| 10,001,240 B1 | 6/2018 | Dray et al. |
| 10,012,340 B1 | 7/2018 | Dray et al. |
| 10,024,768 B1 | 7/2018 | Johnsen |
| 10,094,508 B1 | 10/2018 | Dray et al. |

(56) References Cited

U.S. PATENT DOCUMENTS

| | | |
|---|---|---|
| 10,168,255 B1 | 1/2019 | Johnsen |
| 10,196,243 B1 | 2/2019 | Wells |
| 10,197,206 B1 | 2/2019 | Dray et al. |
| 10,247,643 B1 | 4/2019 | Johnsen |
| 10,261,279 B1 * | 4/2019 | Potter .............. G02B 6/44526 |
| 10,287,940 B2 | 5/2019 | Tonsich |
| 10,345,221 B1 | 7/2019 | Silverman |
| 10,364,718 B2 | 7/2019 | Eddaoudi et al. |
| 10,386,260 B2 | 8/2019 | Dudek |
| 10,408,377 B1 | 9/2019 | Dray et al. |
| 10,486,946 B1 | 11/2019 | Wells |
| 10,501,385 B1 | 12/2019 | Buckner et al. |
| 10,563,555 B2 | 2/2020 | Hamad |
| 10,570,581 B2 | 2/2020 | Faivre |
| 10,605,144 B2 | 3/2020 | Kobayashi |
| 10,633,830 B2 | 4/2020 | Shibamori |
| 10,655,774 B1 | 5/2020 | Dray et al. |
| 10,657,443 B2 | 5/2020 | Araujo et al. |
| 10,688,686 B2 | 6/2020 | Fadhel et al. |
| 10,756,459 B2 | 8/2020 | Jongsma |
| 10,833,434 B1 * | 11/2020 | Tassell, Jr. ............ H01R 9/2416 |
| 10,943,357 B2 | 3/2021 | Badawy et al. |
| 10,948,471 B1 | 3/2021 | MacMullin et al. |
| 10,953,960 B1 | 3/2021 | Sharp |
| 10,962,437 B1 | 3/2021 | Nottrott et al. |
| 10,970,927 B2 | 4/2021 | Sharp |
| 10,990,114 B1 | 4/2021 | Miller |
| 10,997,707 B1 | 5/2021 | Katz et al. |
| 11,010,608 B2 | 5/2021 | Adam et al. |
| 11,112,308 B2 | 9/2021 | Kreitinger et al. |
| 11,125,391 B2 | 9/2021 | Al Khowaiter et al. |
| 11,132,008 B2 | 9/2021 | Miller |
| 11,164,406 B2 | 11/2021 | Meroux et al. |
| 11,221,107 B2 | 1/2022 | Du et al. |
| 11,247,184 B2 | 2/2022 | Miller |
| 11,325,687 B1 | 5/2022 | Sharp |
| 11,332,070 B2 | 5/2022 | Holden et al. |
| 11,345,455 B2 | 5/2022 | Sharp |
| 11,416,012 B2 | 8/2022 | Miller |
| 11,428,600 B2 | 8/2022 | Dankers et al. |
| 11,428,622 B2 | 8/2022 | Borin et al. |
| 11,447,877 B1 | 9/2022 | Ell |
| 11,559,774 B2 | 1/2023 | Miller |
| 11,565,221 B2 | 1/2023 | Miller |
| 11,578,638 B2 | 2/2023 | Thobe |
| 11,578,836 B2 | 2/2023 | Thobe |
| 11,596,910 B2 | 3/2023 | Miller |
| 11,607,654 B2 | 3/2023 | Miller |
| 11,655,748 B1 | 5/2023 | Thobe |
| 11,655,940 B2 | 5/2023 | Thobe |
| 11,662,750 B2 | 5/2023 | Miller |
| 11,686,070 B1 | 6/2023 | Jordan et al. |
| 11,715,950 B2 | 8/2023 | Miller et al. |
| 11,720,526 B2 | 8/2023 | Miller et al. |
| 11,739,679 B2 | 8/2023 | Thobe |
| 11,752,472 B2 | 9/2023 | Miller |
| 11,754,225 B2 | 9/2023 | Thobe |
| 11,774,042 B2 | 10/2023 | Thobe |
| 11,794,153 B2 | 10/2023 | Miller |
| 11,807,945 B2 | 11/2023 | Ell |
| 11,808,013 B1 | 11/2023 | Jordan et al. |
| 11,815,227 B2 | 11/2023 | Thobe |
| 11,920,504 B2 | 3/2024 | Thobe |
| 11,965,317 B2 | 4/2024 | Jordan |
| 11,988,336 B2 | 5/2024 | Thobe |
| 12,000,538 B2 | 6/2024 | Thobe |
| 12,006,014 B1 | 6/2024 | Ernst |
| 12,011,697 B2 | 6/2024 | Miller |
| 12,012,082 B1 | 6/2024 | Pittman, Jr. |
| 12,012,883 B2 | 6/2024 | Thobe |
| 12,043,361 B1 | 7/2024 | Ernst |
| 12,043,905 B2 | 7/2024 | Ell |
| 12,043,906 B2 | 7/2024 | Ell |
| 12,066,843 B2 | 8/2024 | Miller |
| 12,087,002 B1 | 9/2024 | Miller et al. |
| 2002/0014068 A1 | 2/2002 | Mittricker et al. |
| 2002/0178806 A1 | 12/2002 | Valentine |
| 2003/0041518 A1 | 3/2003 | Wallace et al. |
| 2003/0121481 A1 | 7/2003 | Dodd et al. |
| 2003/0158630 A1 | 8/2003 | Pham et al. |
| 2003/0167660 A1 | 9/2003 | Kondou |
| 2003/0178994 A1 | 9/2003 | Hurlimann et al. |
| 2003/0188536 A1 | 10/2003 | Mittricker |
| 2003/0197622 A1 | 10/2003 | Reynard et al. |
| 2003/0227821 A1 | 12/2003 | Bae et al. |
| 2004/0057334 A1 | 3/2004 | Wilmer et al. |
| 2004/0058597 A1 | 3/2004 | Matsuda |
| 2004/0067126 A1 | 4/2004 | Schmidt |
| 2004/0125688 A1 | 7/2004 | Kelley et al. |
| 2004/0249105 A1 | 12/2004 | Nolte et al. |
| 2004/0265653 A1 | 12/2004 | Buechi et al. |
| 2005/0007450 A1 | 1/2005 | Hill et al. |
| 2005/0058016 A1 | 3/2005 | Smith et al. |
| 2005/0146437 A1 | 7/2005 | Ward |
| 2005/0150820 A1 | 7/2005 | Guo |
| 2005/0154132 A1 | 7/2005 | Hakuta et al. |
| 2005/0284333 A1 | 12/2005 | Falkiewicz |
| 2006/0125826 A1 | 6/2006 | Lubkowitz |
| 2006/0278304 A1 | 12/2006 | Mattingly et al. |
| 2007/0175511 A1 | 8/2007 | Doerr |
| 2008/0092625 A1 | 4/2008 | Hinnrichs |
| 2008/0113884 A1 | 5/2008 | Campbell et al. |
| 2008/0115834 A1 | 5/2008 | Geoffrion et al. |
| 2008/0149481 A1 | 6/2008 | Hurt |
| 2008/0283083 A1 | 11/2008 | Piao |
| 2009/0009308 A1 | 1/2009 | Date et al. |
| 2009/0107111 A1 | 4/2009 | Oliver |
| 2009/0175738 A1 | 7/2009 | Shaimi |
| 2009/0183498 A1 | 7/2009 | Uchida et al. |
| 2009/0188565 A1 | 7/2009 | Satake |
| 2009/0197489 A1 | 8/2009 | Caro |
| 2010/0031825 A1 | 2/2010 | Kemp |
| 2010/0049410 A1 | 2/2010 | McKee |
| 2010/0058666 A1 | 3/2010 | Kim |
| 2010/0198775 A1 | 8/2010 | Rousselle |
| 2011/0265449 A1 | 11/2011 | Powell |
| 2012/0027298 A1 | 2/2012 | Dow |
| 2012/0092835 A1 | 4/2012 | Miller |
| 2012/0143560 A1 | 6/2012 | Tabet et al. |
| 2012/0185220 A1 | 7/2012 | Shippen |
| 2012/0276379 A1 | 11/2012 | Daniels et al. |
| 2012/0304625 A1 | 12/2012 | Daikoku |
| 2013/0035824 A1 | 2/2013 | Nakamura |
| 2013/0048094 A1 | 2/2013 | Ballantyne |
| 2013/0062258 A1 | 3/2013 | Ophus |
| 2013/0125323 A1 | 5/2013 | Henderson |
| 2013/0176656 A1 | 7/2013 | Kaisser |
| 2013/0186671 A1 | 7/2013 | Theis |
| 2013/0201025 A1 | 8/2013 | Kamalakannan et al. |
| 2013/0245524 A1 | 9/2013 | Schofield |
| 2013/0293884 A1 | 11/2013 | Lee et al. |
| 2013/0299500 A1 | 11/2013 | McKinnon |
| 2014/0002639 A1 | 1/2014 | Cheben et al. |
| 2014/0008926 A1 | 1/2014 | Allen |
| 2014/0062490 A1 | 3/2014 | Neuman et al. |
| 2014/0090379 A1 | 4/2014 | Powell et al. |
| 2014/0121622 A1 | 5/2014 | Jackson et al. |
| 2014/0133824 A1 | 5/2014 | Yoel |
| 2014/0158616 A1 | 6/2014 | Govind et al. |
| 2014/0158632 A1 | 6/2014 | Govind et al. |
| 2014/0171538 A1 | 6/2014 | Daniels et al. |
| 2014/0176344 A1 | 6/2014 | Littlestar |
| 2014/0190691 A1 | 7/2014 | Vinegar |
| 2014/0194657 A1 | 7/2014 | Wadhwa et al. |
| 2014/0299039 A1 | 10/2014 | Trollux |
| 2014/0345370 A1 | 11/2014 | Marotta |
| 2014/0356707 A1 | 12/2014 | Kwon et al. |
| 2015/0081165 A1 | 3/2015 | Yamashita et al. |
| 2015/0144468 A1 | 5/2015 | Skolozdra |
| 2015/0183102 A1 | 7/2015 | Breschi et al. |
| 2015/0198518 A1 | 7/2015 | Borin et al. |
| 2015/0244087 A1 | 8/2015 | Wing |
| 2015/0269288 A1 | 9/2015 | Moore |
| 2015/0323119 A1 | 11/2015 | Giunta |

(56) References Cited

U.S. PATENT DOCUMENTS

| | | |
|---|---|---|
| 2016/0071059 A1 | 3/2016 | Petering |
| 2016/0091467 A1 | 3/2016 | Morris |
| 2016/0139355 A1 | 5/2016 | Petersen |
| 2016/0169098 A1 | 6/2016 | Makita |
| 2016/0169436 A1 | 6/2016 | Sander et al. |
| 2016/0175634 A1 | 6/2016 | Radian |
| 2016/0238194 A1 | 8/2016 | Adler et al. |
| 2016/0252650 A1 | 9/2016 | Hirst, Sr. |
| 2016/0363249 A1 | 12/2016 | Disher |
| 2016/0369930 A1 | 12/2016 | Poe et al. |
| 2017/0051472 A1 | 2/2017 | Mochimaru |
| 2017/0088401 A1 | 3/2017 | Clements et al. |
| 2017/0122174 A1 | 5/2017 | Patel |
| 2017/0131728 A1 | 5/2017 | Lambert et al. |
| 2017/0158303 A1 | 6/2017 | Michaelis et al. |
| 2017/0248569 A1 | 8/2017 | Lambert et al. |
| 2017/0253737 A1 | 9/2017 | Auld et al. |
| 2017/0253738 A1 | 9/2017 | Auld et al. |
| 2017/0253806 A1 | 9/2017 | Auld et al. |
| 2017/0254481 A1 | 9/2017 | Cadogan et al. |
| 2017/0259229 A1 | 9/2017 | Chou et al. |
| 2017/0306428 A1 | 10/2017 | Helgason et al. |
| 2017/0326474 A1 | 11/2017 | Olovsson |
| 2017/0367346 A1 | 12/2017 | Rees et al. |
| 2018/0002617 A1 | 1/2018 | Umansky et al. |
| 2018/0003116 A1 | 1/2018 | Fersman et al. |
| 2018/0037452 A1 | 2/2018 | Gray et al. |
| 2018/0080356 A1 | 3/2018 | Fukui |
| 2018/0098137 A1 | 4/2018 | Saha |
| 2018/0119882 A1 | 5/2018 | Allidieres et al. |
| 2018/0143734 A1 | 5/2018 | Ochenas et al. |
| 2018/0186528 A1 | 7/2018 | Tonn |
| 2018/0218214 A1 | 8/2018 | Pestun |
| 2018/0223202 A1 | 8/2018 | Fransham et al. |
| 2018/0245313 A1 | 8/2018 | Shibamori et al. |
| 2018/0259064 A1 | 9/2018 | McLemore |
| 2018/0312391 A1 | 11/2018 | Borg |
| 2019/0016963 A1 | 1/2019 | Auld et al. |
| 2019/0121373 A1 | 4/2019 | Panigrahi |
| 2019/0367732 A1 | 5/2019 | Helgason et al. |
| 2019/0270500 A1 | 9/2019 | Hamaoka |
| 2019/0338203 A1 | 11/2019 | Umansky et al. |
| 2019/0359899 A1 | 11/2019 | Umansky et al. |
| 2019/0362147 A1 | 11/2019 | Adam |
| 2019/0136060 A1 | 12/2019 | Helgason et al. |
| 2019/0368054 A1 | 12/2019 | Gummow et al. |
| 2019/0368156 A1 | 12/2019 | Faivre |
| 2020/0033252 A1 | 1/2020 | Borin et al. |
| 2020/0118413 A1 | 4/2020 | Kanukurthy |
| 2020/0232191 A1 | 7/2020 | Prior |
| 2020/0240588 A1 | 7/2020 | Al Khowaiter |
| 2020/0245551 A1 | 8/2020 | Hoffman et al. |
| 2020/0245552 A1 | 8/2020 | Hoffman et al. |
| 2020/0245553 A1 | 8/2020 | Hoffman et al. |
| 2020/0292445 A1 | 9/2020 | Morimoto |
| 2020/0325742 A1 | 10/2020 | Astudillo et al. |
| 2021/0053011 A1 | 2/2021 | Sugiyama et al. |
| 2021/0062697 A1 | 3/2021 | Yokoyama et al. |
| 2021/0073692 A1 | 3/2021 | Saha et al. |
| 2021/0076006 A1 | 3/2021 | O'Neill et al. |
| 2021/0095380 A1 | 4/2021 | Borin et al. |
| 2021/0123211 A1 | 4/2021 | Miller et al. |
| 2021/0138399 A1 | 5/2021 | Yokoyama et al. |
| 2021/0197151 A1 | 7/2021 | Miller |
| 2021/0207772 A1 | 7/2021 | Norton et al. |
| 2021/0215925 A1 | 7/2021 | Kim et al. |
| 2021/0216852 A1 | 7/2021 | Reece et al. |
| 2021/0232163 A1 | 7/2021 | Miller |
| 2021/0232741 A1 | 7/2021 | Ogiso et al. |
| 2021/0362637 A1 | 11/2021 | Hanis et al. |
| 2021/0381920 A1 | 12/2021 | Jacobsz et al. |
| 2022/0001969 A1 | 1/2022 | Pugnetti |
| 2022/0010707 A1 | 1/2022 | Sharma et al. |
| 2022/0048606 A1 | 2/2022 | Singh |
| 2022/0081261 A1 | 3/2022 | Karbassi |
| 2022/0087099 A1 | 3/2022 | Hoffman et al. |
| 2022/0154427 A1 | 5/2022 | Misaki |
| 2022/0178114 A1 | 6/2022 | Takahama |
| 2022/0186470 A1 | 6/2022 | Chiba et al. |
| 2022/0213603 A1 | 7/2022 | Al Eid et al. |
| 2022/0221368 A1 | 7/2022 | Bergeron |
| 2022/0228345 A1 | 7/2022 | Case et al. |
| 2022/0282651 A1 | 9/2022 | Reynolds et al. |
| 2022/0290411 A1 | 9/2022 | Anahara et al. |
| 2022/0343229 A1 | 10/2022 | Gruber et al. |
| 2022/0401899 A1 | 12/2022 | Miller |
| 2022/0404272 A1 | 12/2022 | Kendall et al. |
| 2023/0012673 A1 | 1/2023 | Fukuyama et al. |
| 2023/0015077 A1 | 1/2023 | Kim |
| 2023/0061824 A1 | 3/2023 | Ell |
| 2023/0078852 A1 | 3/2023 | Campbell et al. |
| 2023/0129513 A1 | 4/2023 | Miller |
| 2023/0259080 A1 | 8/2023 | Whikehart et al. |
| 2023/0259088 A1 | 8/2023 | Borup et al. |
| 2023/0332532 A1 | 10/2023 | Thobe |
| 2023/0333577 A1 | 10/2023 | Miller |
| 2023/0333578 A1 | 10/2023 | Miller |
| 2023/0341092 A1 | 10/2023 | Thobe |
| 2023/0347303 A1 | 11/2023 | Miller |
| 2023/0358023 A1 | 11/2023 | Jordan et al. |
| 2023/0366510 A1 | 11/2023 | Thobe |
| 2023/0383416 A1 | 11/2023 | Ell |
| 2023/0383418 A1 | 11/2023 | Ell |
| 2023/0392536 A1 | 12/2023 | Thobe |
| 2023/0399817 A1 | 12/2023 | Jordan |
| 2023/0399818 A1 | 12/2023 | Jordan |
| 2023/0407488 A1 | 12/2023 | Ell |
| 2023/0415106 A1 | 12/2023 | Miller |
| 2024/0003016 A1 | 1/2024 | Ell |
| 2024/0060189 A1 | 2/2024 | Ell |
| 2024/0141506 A1 | 5/2024 | Ell |
| 2024/0166492 A1 | 5/2024 | Thobe |
| 2024/0209988 A1 | 6/2024 | Thobe |
| 2024/0217498 A1 | 7/2024 | Pittman, Jr. |
| 2024/0255102 A1 | 8/2024 | Thobe |
| 2024/0269626 A1 | 8/2024 | Miller |
| 2024/0271556 A1 | 8/2024 | Thobe |
| 2024/0278762 A1 | 8/2024 | Pittman, Jr. |
| 2024/0278894 A1 | 8/2024 | Ernst |
| 2024/0286726 A1 | 8/2024 | Ernst |

FOREIGN PATENT DOCUMENTS

| | | |
|---|---|---|
| CA | 2447358 | 4/2005 |
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CA | 2916141 | 6/2017 |
| CN | 2092562 | 1/1992 |
| CN | 200958686 | 10/2007 |
| CN | 100348970 | 11/2007 |
| CN | 102997052 | 3/2013 |
| CN | 202898548 U | 4/2013 |
| CN | 103106764 | 5/2013 |
| CN | 103497804 | 1/2014 |
| CN | 102997061 | 5/2015 |
| CN | 204824775 | 12/2015 |
| CN | 205640252 | 10/2016 |
| CN | 104372350 B | 2/2017 |
| CN | 106764463 | 1/2019 |
| CN | 110513604 | 11/2019 |
| CN | 210176958 | 3/2020 |
| CN | 111537157 | 8/2020 |
| CN | 114001278 | 2/2022 |
| CN | 114877263 | 4/2023 |
| EP | 2602609 | 6/2013 |
| EP | 3076461 | 10/2016 |
| EP | 3101411 | 12/2016 |
| EP | 3112011 | 1/2017 |
| EP | 2994626 | 1/2018 |
| EP | 3285759 | 2/2018 |

(56) References Cited

FOREIGN PATENT DOCUMENTS

| | | |
|---|---|---|
| ES | 2398302 | 3/2013 |
| FR | 2388762 | 11/1978 |
| FR | 2689241 | 10/1993 |
| GB | 1179978 | 2/1970 |
| GB | 2097687 | 11/1982 |
| GB | 2545207 | 6/2017 |
| GB | 2559149 | 4/2022 |
| IN | 202141001384 | 1/2021 |
| IT | 201900008235 | 12/2020 |
| JP | 2004125039 | 4/2004 |
| JP | 2007204023 | 8/2007 |
| JP | 2008097832 | 4/2008 |
| JP | 2012002159 | 11/2014 |
| JP | 2016078893 | 5/2016 |
| KR | 20110010316 | 2/2011 |
| KR | 20130038986 | 4/2013 |
| KR | 102129951 | 7/2020 |
| KR | 102169280 | 10/2020 |
| KR | 102281640 | 7/2021 |
| NO | 2007149851 | 12/2007 |
| RU | 2760879 | 12/2021 |
| WO | 1996006685 | 5/1996 |
| WO | 1997006004 | 2/1997 |
| WO | 1997006298 | 2/1997 |
| WO | 1998003711 | 1/1998 |
| WO | 2000063108 | 10/2000 |
| WO | 2002030551 | 4/2002 |
| WO | 2003003002 | 1/2003 |
| WO | 2003066423 | 8/2003 |
| WO | 2004003293 | 1/2004 |
| WO | 2004092307 | 10/2004 |
| WO | 2005018300 | 3/2005 |
| WO | 2007107652 | 9/2007 |
| WO | 2007112335 | 10/2007 |
| WO | 2009013544 | 1/2009 |
| WO | 2009055024 | 4/2009 |
| WO | 2010042704 | 4/2010 |
| WO | 2010103260 | 9/2010 |
| WO | 2013112274 | 8/2013 |
| WO | 2014089443 | 6/2014 |
| WO | 2014173672 | 10/2014 |
| WO | 2015061868 | 5/2015 |
| WO | 2015153607 | 10/2015 |
| WO | 2016004107 | 1/2016 |
| WO | 2016026043 | 2/2016 |
| WO | 2016146404 | 9/2016 |
| WO | 2017074985 | 5/2017 |
| WO | 2017083778 | 5/2017 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| WO | 2020223803 | 11/2020 |
| WO | 2020237112 | 11/2020 |
| WO | 2021062563 | 4/2021 |
| WO | 2021100054 | 5/2021 |
| WO | 2022043197 | 3/2022 |
| WO | 2022126092 | 6/2022 |
| WO | 2022149501 | 7/2022 |
| WO | 2023287276 | 1/2023 |
| WO | 2023038579 | 3/2023 |
| WO | 2023137304 | 7/2023 |
| WO | 2023164683 | 8/2023 |
| ZA | 9606765 | 2/1998 |
| ZA | 200610366 | 1/2008 |

OTHER PUBLICATIONS

ACTI, "Advanced Maritime Emissions Control System (AMECS)", retrieved at https://sustainableworldports.org/wp-content/uploads/presentation-on-AMECS.pdf.
Skelton et al., Onboard Refueling Vapor Recovery Systems Analysis of Widespread Use,Nescaum, Boston MA, Aug. 20, 2007.
Membrane Technology and Research, Inc., Gasoline Vapor Recovery, 2018.
Jordan Technologies, Aereon, Recovering More Vapor=Increased Profits, 2015.
EPFL, Capturing CO2 from trucks and reducing their emissions by 90%, Dec. 23, 2019.
Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.
Information Disclosure Declaration by Kyle E. Miller, Dec. 18, 2020.
Cott Manufacturing Company, FinkLet®/FinkPlate® Cathodic Proection Test Stations, Wayback Machine, May 22, 2000.
Lloyd's Register, Using technology to trace the carbon intensity of sustainable marine fuels, Feb. 15, 2023.
Alexandrakis et al.,"Marine Transportation for Carbon Capture and Sequestration (CCS)", Department of Civil and Environmental Engineering, Thesis, Massachusetts Institute of Technology, Jun. 2010.
Datta et al., "Advancing carbon management through the global commoditization of CO2: the case for dual-use LNG-CO2 shipping", Carbon Management, 2020, vol. 11, No. 6, 611-630.
Ibitoye et al., "Poster Abstract: A Convolutional Neural Network Based Solution for Pipeline Leak Detection", School of Information Technology, Carleton University, Ottawa, Canada, Nov. 2019.
IntelliView, "Thermal Imaging Provides Early Leak Detection in Oil and Gas Pipelines", Petro Industry News, www.Petro-Online.com, Aug./Sep. 2018.
Southwest Research Institute, "Methane Leak Detection", 2021.
Neutrik XXR-2 XX Series, https://www.parts-express.com/Neutrik-XXR-2-XX-Series-Color-Coding_Ring-Red, 2022.
Hou, Qingmin, An FBG Strain Sensor-Based NPW Method for Natural Gas Pipeline Leakage Detection, Hindawi, Mathematical Problems in Engineering, vol. 2021, Article ID 5548503, pp. 1-8.
Borin Manufacturing, Inc., Dart for Test Station, Above Ground Remote Monitoring, Feb. 11, 2021.
Borin Manufacturing, Inc., Commanche Remote Monitoring and Control System, Mar. 24, 2017.
Borin Manufacturing, Inc., Dart for Rectifiers, Remote Monitoring and Control System. Nov. 1, 2017.
Borin Manufacturing, Inc., Stelth 2 Solid-State Reference Electrode for Buried and Concrete Service, Aug. 7, 2015.
Borin Manufacturing, Inc., Stelth 3, Nov. 10, 2016.
Borin Manufacturing, Inc., Stelth Reference Electrodes, Feb. 4, 2016.
Borin Manufacturing, Inc., Stelth Solid-State Reference Electrodes, Nov. 8, 2016.
Borin Manufacturing, Inc., Stelth Reference Electrodes, Oct. 10, 2017.
Borin Manufacturing, Inc., 'Miracle half-cell', Palladium: Borin's new reference electrode chemistry, Aug. 13, 2014.
Borin Manufacturing, Inc., Street Dart, For Test Station, Ground Level Remote Monitoring, Mar. 2017.
International Search Report and Written Opinion for international application No. PCT/US2024/021099 mailed on Aug. 2, 2024.
Annex to Form PCT/ISA/206, Communication Relating to the Results of the Partial International Search for international application No. PCT/US2024/021101 mailed Aug. 13, 2024.
Sadovnychiy, Sergiy et al. "Geographical information system applications for pipeline right of way aerial surveillance", International Conference on Geographical Information Systems Theory, Applications and Management, vol. 2, Scitepress, 2017.
Paschal, Kayla, "Utility Right of Way Management: Potential for Expanded Integrated Vegetation Management in California", 2014.

* cited by examiner

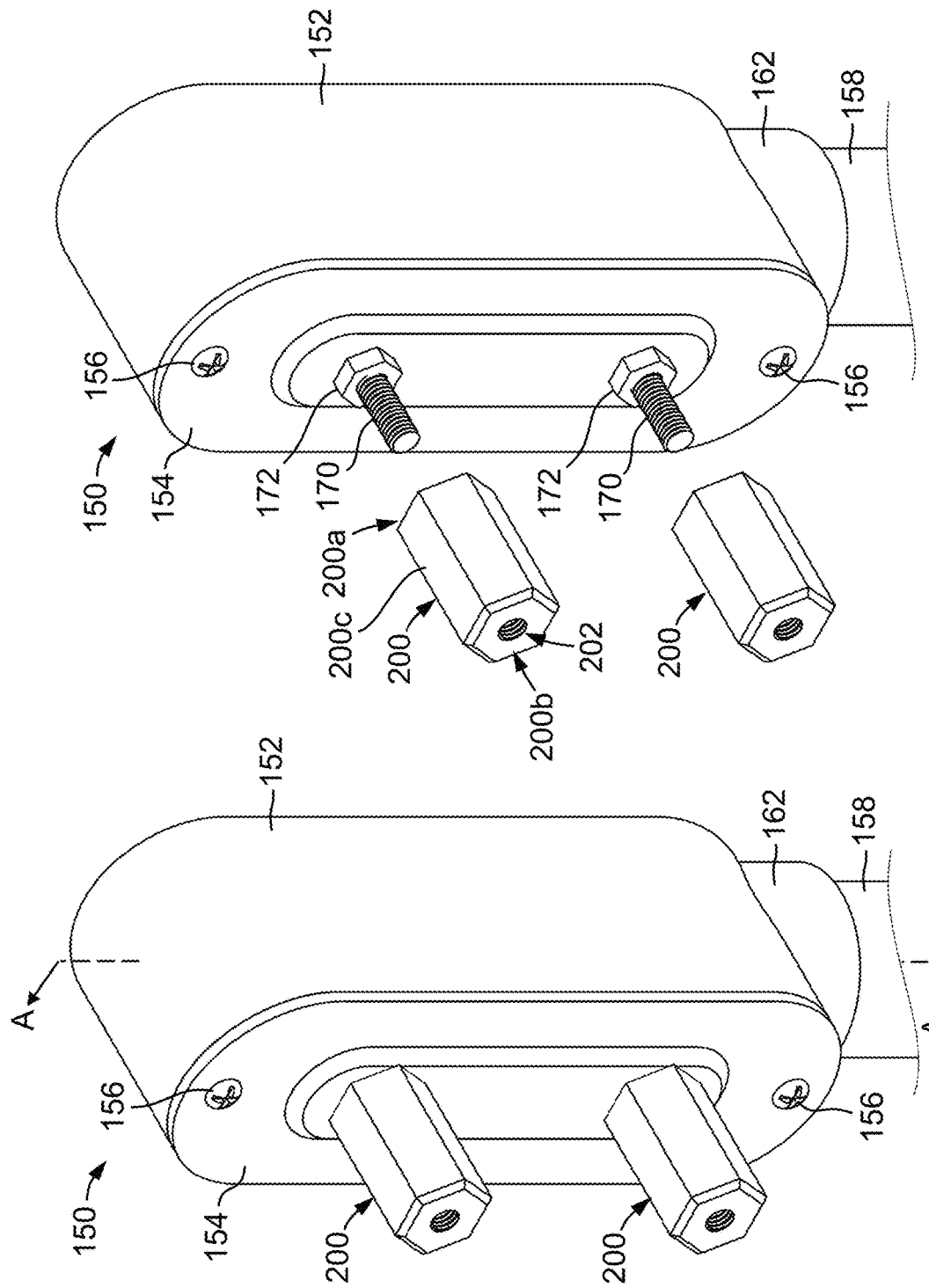

TEST STATION ASSEMBLIES FOR MONITORING CATHODIC PROTECTION OF STRUCTURES AND RELATED METHODS

CROSS-REFERENCE TO RELATED APPLICATIONS

The present application claims priority to and the benefit of U.S. Provisional Application No. 63/466,056, filed May 12, 2023, titled "TEST STATION ASSEMBLIES FOR MONITORING CATHODIC PROTECTION OF STRUCTURES AND RELATED METHODS," U.S. Provisional Application No. 63/466,062, filed May 12, 2023, titled "TEST STATION ASSEMBLIES FOR MONITORING CATHODIC PROTECTION OF STRUCTURES AND RELATED METHODS," and U.S. Provisional Application No. 63/513,391, filed Jul. 13, 2023, titled "ELECTRODE WATERING ASSEMBLIES AND METHODS FOR MAINTAINING CATHODICMONITORING OF STRUCTURES," the disclosures of each of which are incorporated herein by reference in their entireties. The present application is also a continuation-in-part of U.S. Non-Provisional application Ser. No. 17/886,178, filed Aug. 11, 2022, titled "ASSEMBLIES AND METHODS FOR MONITORING CATHODIC PROTECTION OF STRUCTURES," which is a divisional of U.S. Non-Provisional application Ser. No. 17/805,801, filed Jun. 7, 2022, titled "ASSEMBLIES AND METHODS FOR MONITORING CATHODIC PROTECTION OF STRUCTURES," now U.S. Pat. No. 11,447,877, issued Sep. 20, 2022, which claims priority to and the benefit of U.S. Provisional Application No. 63/365,102, filed May 20, 2022, titled "ASSEMBLIES AND METHODS FOR MONITORING CATHODIC PROTECTION OF STRUCTURES," and U.S. Provisional Application No. 63/260,622, filed Aug. 26, 2021, titled "MINIATURE IR ERROR-FREE CATHODIC PROTECTION COUPON ASSEMBLY INSTALLED VIA PROBE," the disclosures of each of which are incorporated herein by reference in their entireties.

BACKGROUND

This disclosure relates to assemblies and methods for monitoring cathodic protection of buried or submerged structures. More particularly, this disclosure relates to assemblies and methods including a cathodic protection coupon monitoring assembly for monitoring the cathodic protection of buried or submerged structures and test station assemblies for monitoring conditions detected using the cathodic protection coupon.

Cathodic protection of metallic structures covered in an electrolyte associated with soil or a fluid is an established technique for reducing the rate of corrosion of the structure. Such cathodic protection may be facilitated by a cathodic protection system, which may use an electrical energy source to provide a cathodic current distributed over the surface of the structure and may take the form of sacrificial anodes, AC-to-DC rectifiers, and/or direct DC sources (such as batteries, solar panels, etc.). Once the cathodic protection system has been implemented, the effectiveness of the protection resulting from operation of the cathodic protection system may be assessed by measuring the electrical potential difference between the structure and a reference electrode.

A cathodic protection monitoring assembly used to assess the effectiveness of the cathodic protection system may simulate the conditions of uncoated bare metal of a known surface area on a structure that might normally result from a coating defect. In such a simulation, an electrical potential difference may be measured between a metallic coupon and the surrounding soil or fluid, and this measured electrical potential difference may be compared to cathodic protection criteria for the structure's material to determine whether an active corrosion process is occurring. Accurately measuring the true electric potential difference of the structure, however, has often been difficult, for example, due to errors or offsets resulting from nearby current sources, which may include otherwise uninterruptible sources such as sacrificial anodes directly bonded to the protected structure, foreign rectifiers, stray currents, etc. For example, for situations in which several rectifiers protect the structure, it may be necessary for all the rectifiers to be interrupted simultaneously in order to obtain meaningful measurements that are not effected by electrical current associated with the rectifiers. In addition, the time window with which to measure the potential difference may be relatively brief because, for example, the amount of time between current interruption and depolarization (which refers to the effects of the electrical current as the structure de-energizes and discharges its electric charge) may vary from several seconds to just a fraction of a second, depending on the characteristics of the structure protected by the cathodic protection system and/or the surrounding environment. Furthermore, capacitive spikes that may occur shortly after current is interrupted may also mask the true potential difference intended to be measured.

In an effort to address these challenges, a reference electrode may be incorporated adjacent the metallic coupon in the cathodic protection monitoring system. The reference electrode may allow a technician to obtain error-free structure-to-electrolyte (or electrical potential difference) measurements without a need to interrupt or disrupt nearby current sources. The electrical potential difference may thus be measured reliably without needing to disrupt the current associated with operation of the cathodic protection system to facilitate measurement of the electrical potential difference and/or without knowing the exact soil or fluid conditions and resistance in the vicinity of the measurements.

In addition, a cathodic protection monitoring assembly may include a test station placed at an accessible location to provide a terminal location whereby personnel may measure the electrical potential is detected by the cathodic protection monitoring assembly. For example, when the cathodic protection monitoring assembly is utilized to monitor the effectiveness of a cathodic protection system for a structure buried under the ground, the test station may be placed above the ground to allow for ease of access to personnel during operations.

Accordingly, Applicant has recognized that there may be a desire to provide improved test stations for cathodic protection monitoring assemblies to improve both safety to technicians (particularly with respect to electric shock) and the functionality of the test stations for obtaining electrical potential measurements during operations. This disclosure may address one or more of the above-referenced considerations, as well as possibly others.

BRIEF SUMMARY

Some embodiments disclosed herein are directed to test station assemblies for a cathodic protection monitoring assembly that include or incorporate nonconductive caps that may protect personnel (or passersby) from directly contacting electrically energized test posts of the test station assembly. In some embodiments, the test station assembly may include one or more appropriately sized openings such that personnel may access the test posts during a survey of the cathodic protection system without removing or disturbing the caps. Thus, through use of the embodiments disclosed herein, the risk of electric shock due to inadvertent contact with the test post(s) of a test station assembly for a cathodic protection monitoring assembly may be reduced.

Some embodiments disclosed herein are directed to a cathodic protection test station assembly for monitoring a cathodic protection system of an at least partially buried or submerged structure. In some embodiments, the cathodic protection test station assembly includes a housing at least partially defining an inner chamber, the housing including a connector and an opening. In addition, the cathodic protection test station assembly includes a pole configured to connect to the connector of the housing such that an electrical conductor extending through the pole is configured enter into the inner chamber via the connector. The electrical conductor is configured to be connected to a coupon assembly buried or submerged proximate the structure. Further, the cathodic protection test station assembly includes a face plate configured to attach to the housing to at least partially cover the opening of the housing and an electrically conductive test post configured to connect to the face plate such that a first end portion of the test post is to connect to the electrical conductor in the inner chamber of the housing and a second end portion of the test post is to extend away from the face plate outside of the inner chamber. Still further, the cathodic protection test station assembly includes a cap including a non-conductive material that is configured to cover the test post outside of the inner chamber. The cap includes: (a) an internal passage configured to receive the test post therein, and (b) an opening into the internal passage configured to receive a probe of a voltmeter therethrough to contact the test post, thereby to facilitate measurement of voltage detected by the coupon assembly corresponding to one or more of a voltage of the structure and the coupon assembly.

Some embodiments disclosed herein are directed to a cathodic protection test station assembly for monitoring a cathodic protection system of a buried or submerged structure. In some embodiments, the cathodic protection test station assembly includes a non-conductive housing configured to connect to a shaft including an electrical conductor, the electrical conductor connected to a coupon assembly buried or submerged proximate the structure. In addition, the cathodic protection test station assembly includes an electrically conductive test post (a) including a proximal end portion connected to the electrical conductor and a distal end portion and (b) configured to connect to the housing such that the distal end portion extends outwardly from the non-conductive housing and the proximal end portion substantially resides within the housing. Still further, the cathodic protection test station assembly includes a cap comprising a non-conductive material and an opening, the cap configured to (a) connect to and substantially surround the test post and (b) enable a probe to contact the test post via the opening to facilitate measurement of voltage detected by the coupon assembly.

Some embodiments disclosed herein are directed to a cathodic protection monitoring assembly for monitoring a cathodic protection system of an at least partially buried structure. In some embodiments, the cathodic protection monitoring assembly includes a first electrical conductor, an electrically conductive test coupon (a) positioned underground and proximate the structure and (b) connected to the first electrical conductor, a second electrical conductor, a reference electrode connected to the second electrical conductor, and a third electrical conductor connected to the structure and the first electrical conductor. In addition, the cathodic protection monitoring assembly includes a test station assembly including a housing including an opening to receive the first electrical conductor and the second electrical conductor therethrough into the housing. In addition, the test station includes a first test post and a second test post each comprising an electrically conductive material. The first test post is configured to connect to the housing such that a first portion of the first test post extends outwardly from the housing and a second portion of the first test post substantially resides within the housing and connects to the first electrical conductor, and the second test post is configured to connect to the housing such that a first portion of the second test post extends outwardly from the housing and a second portion of the second test post substantially resides within the housing and connects to the second electrical conductor. Further, the test station includes a first cap and a second cap each comprising a non-conductive material. The first cap is configured to substantially cover the first portion of the first test post and the second cap is configured to cover the first portion of the second test post. In addition, the first cap and the second cap each include an opening configured to allow a probe to pass therethrough and contact the first test post and the second test post, respectively, to facilitate measurement of voltages detected by the electrically conductive test coupon, the structure, and the reference electrode.

Some embodiments disclosed herein are directed to a method of installing a cathodic protection monitoring assembly to monitor cathodic protection of an at least partially buried structure or submerged structure. In some embodiments, the method includes connecting an electrical conductor from a coupon assembly to a conductive test post of a test station assembly, the coupon assembly including an electrically conductive test coupon and a reference electrode, the test post extending outward from a housing of the test station assembly. In addition, the method includes connecting a cap to the test post. Further, the method includes covering the test post with the cap as a result of the connecting. Still further, the method includes exposing the test post through an opening in the cap to facilitate measurement of voltages detected by the coupon assembly.

Some embodiments disclosed herein are directed to a kit to provide enhanced monitoring at a test station assembly of a cathodic protection system of an at least partially buried or submerged structure. In some embodiments, the kit includes a container and a probe positioned in the container and configured to connect to a measurement device. In addition, the kit includes a plurality of caps positioned in the container, each of the plurality of caps configured to connect to test posts of a face plate of the test station assembly and, when connected to the test posts, to substantially cover the test posts, each of the plurality of caps including an opening of a size to allow passage of the probe therethrough to facilitate measurement of voltage detected by a coupon assembly (a) positioned proximate the structure and (b) attached to the test posts.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various embodiments, reference will now be made to the accompanying drawings in which:

FIG. 2 is a perspective view of the test station assembly of the cathodic protection monitoring assembly of FIG. 1 including caps that cover one or more test posts of the test station assembly according to some embodiments of this disclosure;

FIG. 3 is partially exploded perspective view of the test station assembly of FIG. 2 showing the caps removed from the test posts according to some embodiments of this disclosure;

DETAILED DESCRIPTION

As previously described, a test station may be included in a cathodic protection monitoring assembly for assessing the effectiveness of a cathodic protection system for a buried or submerged structure (such as a pipeline). The test station may include one or more test posts that are electrically connected to electrically conductive components of the cathodic protection system (such as the metallic coupon, reference electrode, among other components) as well as to the buried or submerged structure itself. Thus, personnel (or passersby) may be at risk for electric shock by contacting the leads or terminals, particularly when the contact is with bare skin.

Accordingly, embodiments disclosed herein are directed to test station assemblies that include or incorporate non-conductive caps that may protect personnel (or passersby) from directly contacting the tests posts. In some embodiments, the test station assembly may include one or more appropriately sized openings such that personnel may access the test posts during a survey of the cathodic protection system without removing or disturbing the caps. Thus, through use of the embodiments disclosed herein, the risk of electric shock due to inadvertent contact with the test post(s) of a test station assembly for a cathodic protection monitoring assembly may be reduced.

Figure 1:
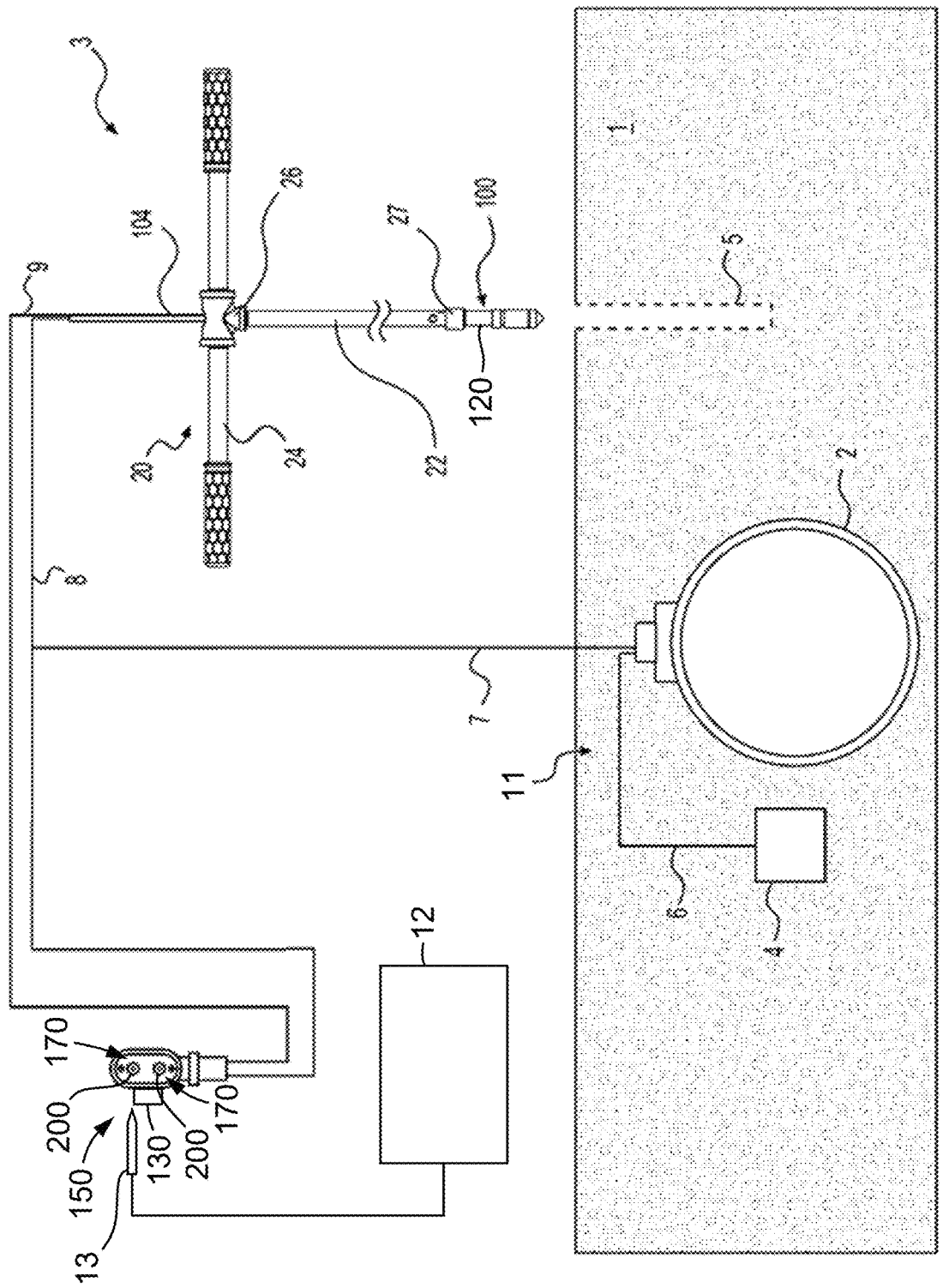
FIG. 1 is a schematic diagram of a cathodic protection monitoring assembly including a test station assembly according to some embodiments of this disclosure.

FIG. 1 is a schematic view of example components of a cathodic protection monitoring assembly 3 for monitoring the effectiveness of a cathodic protection system 11, according to embodiments of the disclosure. As shown in FIG. 1, the cathodic protection monitoring assembly 3 may include a coupon assembly 100 and a test station assembly 150 electrically connected to the coupon assembly 100. In some embodiments, the coupon assembly 100 may be a voltage drop, error-free coupon assembly. The example coupon assembly 100 may be configured to facilitate potential difference measurements for a structure 2 that is subject to cathodic protection by the cathodic protection system 11 and is at least partially buried in the ground 1 or submerged in a fluid. In the example of FIG. 1, the structure 2 includes a buried pipeline for transporting hydrocarbons (such as oil, natural gas, renewable hydrocarbons, or other hydrocarbon-based fluids). The cathodic protection system 11 may provide cathodic protection, for example, using a sacrificial anode 4 electrically connected to the structure 2 by a conductor 6, such as a cable. In some embodiments, the cathodic protection monitoring assembly 3 may be configured to provide electrical potential difference measurements that are "instant off" in nature and/or substantially free of voltage drop error.

In some embodiments, a probe rod 20 may be used to insert the coupon assembly 100 into the ground 1, proximate the structure 2. The probe rod 20 may include an elongate rod member 22 extending between a proximal or first rod end 26 and a distal or second rod end 27. A transverse handle or grasping portion 24 may be located at or near the first rod end 26 to provide a technician using the probe rod 20 with enhanced leverage and/or torque for driving the probe rod 20 into the ground 1. In some embodiments, the grasping portion 24 may include a T-handle, for example, as shown in FIG. 1. In some embodiments, the coupon assembly 100 and probe rod 20 may be the same or similar to the coupon assembly 100 and probe rod described in U.S. Pat. No. 11,447,877, the contents of which are incorporated herein by reference in their entirety.

The coupon assembly 100 may include a test coupon 120 and a reference electrode (not shown) that are electrically connected to the test station assembly 150 via electrical conductors 8, 9 that are contained within a wire bundle 104. Another electrical conductor 7 connected to the structure 2 may also be connected to the test station assembly 150 (either together with electrical conductor 8 or independently). As used herein, the terms "electrical conductor" or "conductor" (such as the conductors 6, 7, 8, 9, 151 described herein), and the like, is meant to broadly include any suitable electrically conductive wave guide that may route or channel electrical current therethrough. Thus, the terms "electrical conductor," "conductor," and the like, specifically include metallic wire(s), and/or cables, and may also include other electrically conductive features, such as connectors, conductive traces, and/or plugs.

The probe rod 20 may be used to stabilize and insert the coupon assembly 100 into a pilot hole 5 formed (such as probed) in the ground 1 adjacent to the structure 2. The coupon assembly 100 may be configured to engage the second rod end 27 of the elongate rod member 22 during assembly of the coupon assembly 100 with the probe rod 20 for installation of the coupon assembly 100 in the ground 1. The wire bundle 104 extends from the coupon assembly 100 and through an internal cavity in the probe rod 20 so that the electrical conductors 8, 9 may be maintained for connection to the test station assembly 150 after the coupon assembly 100 has been installed in the ground 1. Once the coupon assembly 100 is inserted into the ground 1, the probe rod 20 may be disconnected from the coupon assembly 100 and the conductors 8, 9 may be connected to test station assembly 150.

As will be described in more detail below, the test station assembly 150 may include one or more test posts 170 that are electrically connected to one or more components of the cathodic protection monitoring assembly 3, the structure 2, and/or the anode 4 (such as via electrical conductors 6, 7, 8, and 9). Specifically, the test post(s) 170 of the test station assembly 150 may be electrically connected to one or more of the coupon assembly 100 (including the test coupon 120 and/or the reference electrode (not shown)), and the structure 2. A technician may connect a probe 13 of a voltmeter 12 (or other suitable measurement device such as a potentiometer) to one or more of the test post(s) 170 on the test station assembly 150 to assess the effectiveness of cathodic protection for the structure 2 based on an electrical potential of one or more of the coupon assembly 100 (such as the test coupon 120) and/or the structure 2.

In addition, in some embodiments, the test station 150 may include one or more electrical switches 130 that may each allow personnel to electrically disconnect a test post 170 from the corresponding component of the cathodic protection system. For instance, in some embodiments, the electrical switch 130 may allow personnel to electrically disconnect the coupon assembly 100 from a test post 170 so as to electrically disconnect the coupon assembly 100 from the cathodic protection system 11.

Further details of embodiments of the test station assembly 150 are described below. However, it should be appreciated that each of the test post(s) 170 includes a non-conductive (or electrically insulating) cap 200 that allows engagement of the probe 13 with the conductive test post 170, while also preventing inadvertent contact by the technician with the test post 170 so that the risk of electric shock is reduced.

Figure 4:
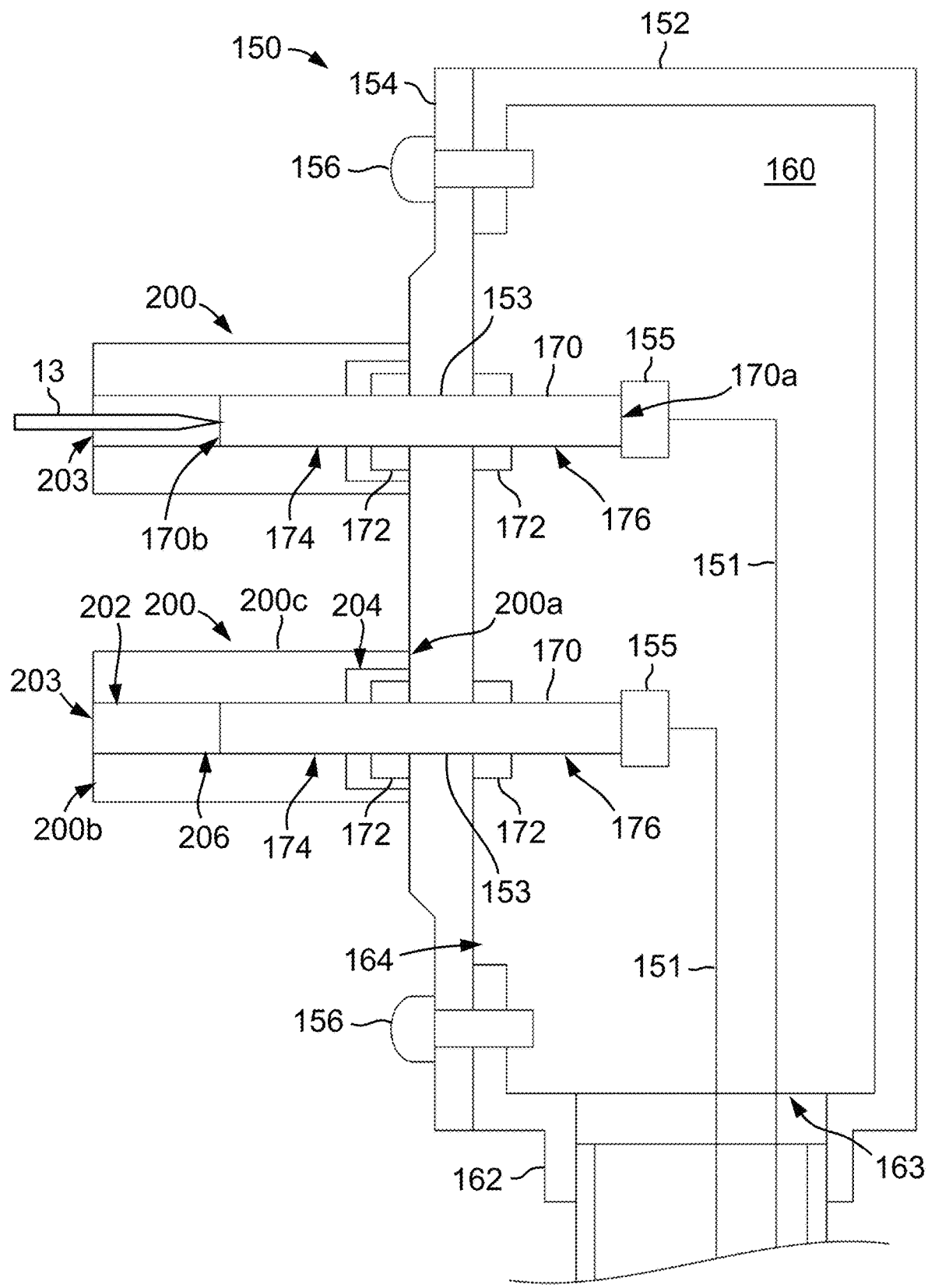
FIG. 4 is a cross-sectional view of the test station assembly of FIG. 2 taken along section A-A in FIG. 2 according to some embodiments of this disclosure.

FIGS. 2-4 show the test station assembly 150 of the cathodic protection monitoring assembly 3 (FIG. 1) according to some embodiments. The test station assembly 150 includes a housing 152 that is connected to a pole or shaft 158.

The housing 152 may at least partially define an interior or inner chamber 160 (FIG. 4). In addition, the housing 152 may include a connector 162 that defines a first opening or aperture 163 (FIG. 4) into the chamber 160. In some embodiments, the connector 162 may include a female pipe fitting that receives (such as slidingly engages or threadably engages) a corresponding male fitting on a pipe (such as the pole 158 as shown in FIGS. 2-4). Further, as is also shown in FIG. 4, the housing 152 may include a second opening or aperture 164 into the chamber 160 that is separate and independent from the first opening 163.

The pole 158 may comprise an elongate conduit or pipe (such as galvanized pipe, polyvinyl chloride (PVC) pipe, or other non-conductive pipe) that is secured to the ground (such as the ground 1 shown in FIG. 1). In addition, the pole 158 may be inserted within or otherwise connected to the connector 162 so as to support and elevate the housing 152 of test station assembly 150 above the ground to facilitate ease of access to the test station assembly 150 for a technician. In addition, as shown in FIG. 4, the pole 158 may also function as a conduit for one or more electrical conductors or wires 151, which may correspond to one or more of the conductors 7, 8, 9 shown in FIG. 1, into the chamber 160 of housing 152 via the first opening 163.

A face plate 154 is connected to the housing 152 via one or more screws 156 (or other connection members) such that the face plate 154 generally occludes or covers the second opening 164. Accordingly, the face plate 154 at least partially defines the inner chamber 160 along with the housing 152 when face plate 154 is connected thereto. Thus, the face plate 154 may be referred to herein as being a part of the housing 152.

As shown in FIGS. 3 and 4, the face plate 154 supports one or more (two in the illustrated embodiment) test posts 170 that extend or project through apertures (or holes) 153 in the face plate 154 and into the chamber 160. The test posts 170 comprise a conductive material, such as, for instance a metallic material (for example, copper, stainless steel, aluminum, or other metallic material as will be understood by one skilled in the art). When face plate 154 is connected to housing 152, each test post 170 includes a first or inner end 170a that is positioned within the chamber 160 of housing 152 and a second or outer end 170b that is positioned outside of the housing 152 (and thus outside of chamber 160) and projected (or extended) away from the face plate 154. As a result, as shown in FIG. 4, the test posts 170 are connected to the face plate 154 such that each test post 170 includes a first (or distal) portion 174 extending from the face plate 154 to the outer end 170b and a second (or proximal) portion 176 extending from the face plate 154 to the inner end 170a. Thus, for each test post 170, the outer end 170b may also be referred to herein as a distal end of the test post 170, and the inner end 170a may also be referred to herein as a proximal end of the test post 170.

As shown in FIG. 4, the inner ends 170a of test posts 170 are electrically connected to a corresponding one of the electrical conductors 151 via suitable connectors 155 (such as clamps, threaded connectors, soldered connectors). Thus, electricity may be conducted between the outer ends 170b of test posts 170 and electrical conductors 151 via the inner ends 170a and connectors 155 during operations.

The test posts 170 may be secured to the face plate 154 via one or more threaded nuts 172 (or other suitable connection members). Specifically, as shown in the embodiment of FIG. 4, each test post 170 may be secured to face plate 154 via a pair of threaded nuts 172 engages on either side of the face plate 154—with one threaded nut 172 engaged with the proximal portion 176 of the test post 170 along face plate 154 inside the chamber 160 of housing 152 and another threaded nut 172 engaged with the distal portion 174 of test post 170 along face plate 154 outside of the chamber 160 of housing 152. Thus, test posts 170 may comprise elongate threaded rods in some embodiments.

The face plate 154 may comprise an electrically non-conductive (or electrically insulative) material, such as, for instance a polymeric material (such as plastic), an elastomeric material (such as natural or synthetic rubber), or other electrically non-conductive materials. Thus, the test posts 170 and threaded nuts 172 are electrically isolated (or insulated) from the housing 152 and pole 158 via the face plate 154. In some embodiments, one or both of the housing 152 and pole 158 may also comprise an electrically non-conductive (or electrically insulative) material (such as any one or more of the example electrically non-conductive materials described herein).

Figure 6:
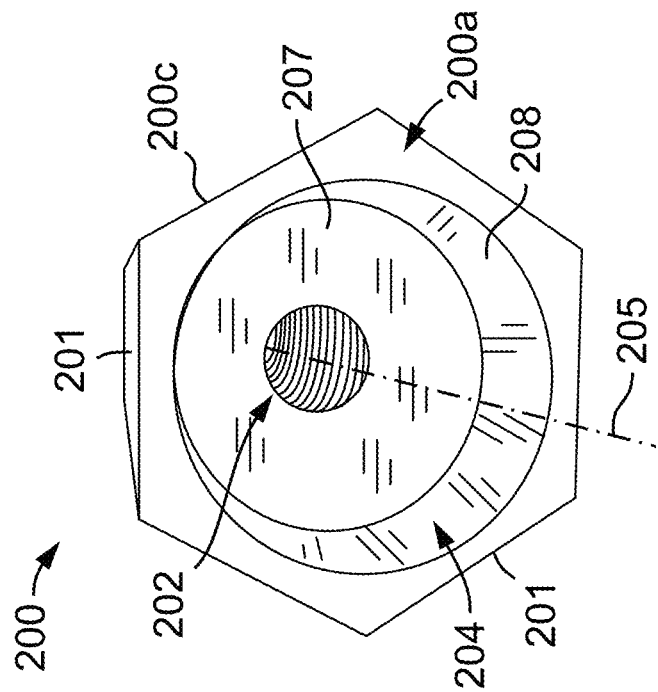
FIGS. 5 and 6 are perspective views of one of the caps of the test station assembly of FIG. 2 according to some embodiments of this disclosure.
Figure 5:
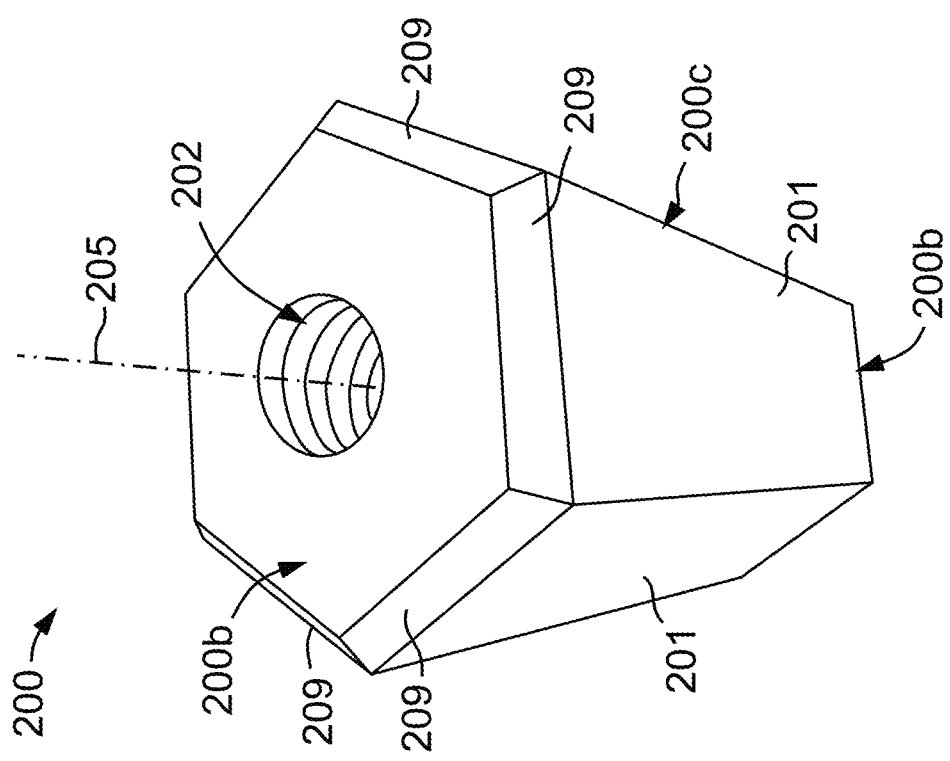
Figure 7:
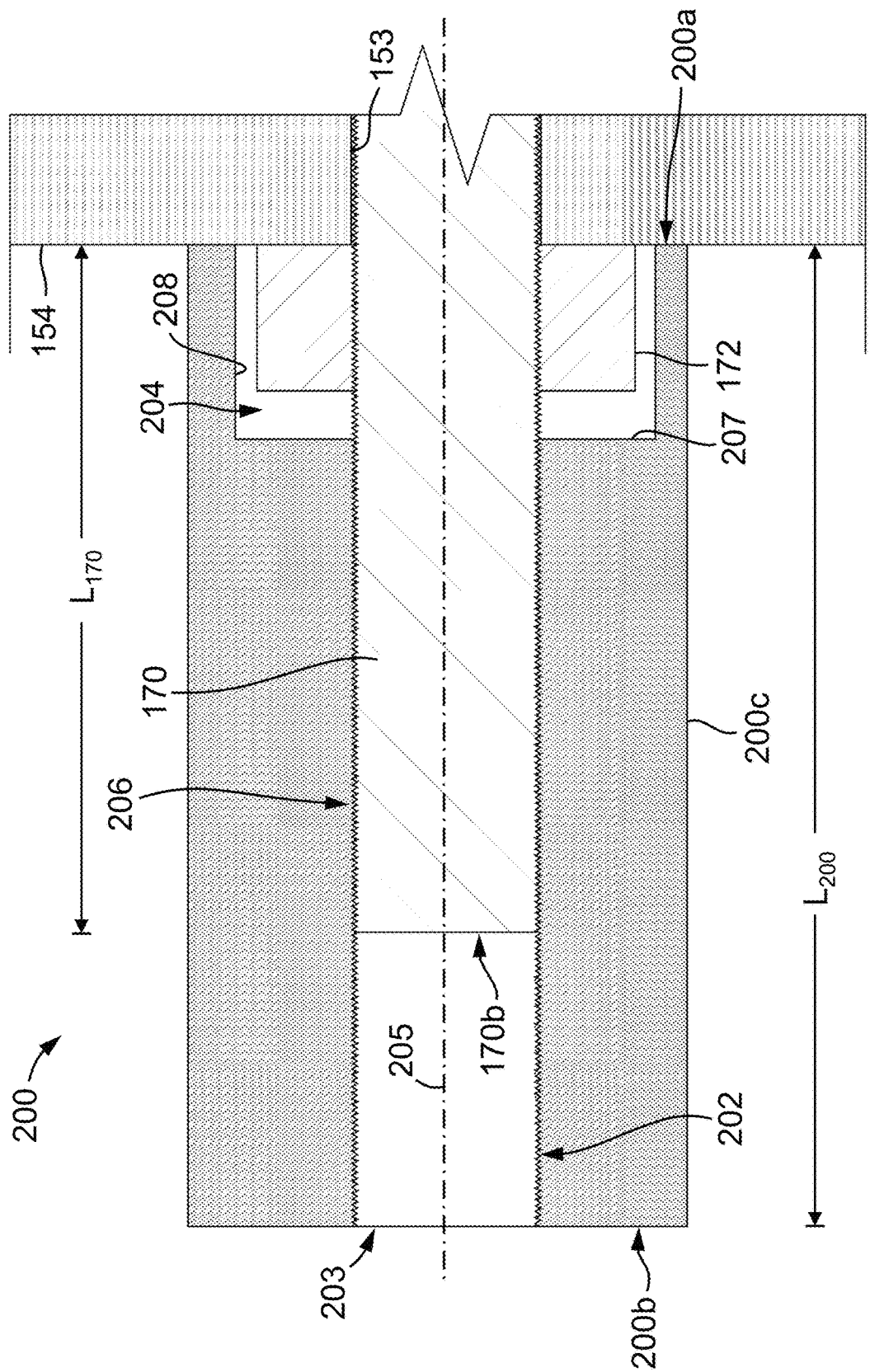
FIG. 7 is an enlarged cross-sectional view of one of the caps covering a test post of the test station assembly of FIG. 2 according to some embodiments of this disclosure.

In addition, as previously described, a cap 200 may cover each test post 170 from the face plate 154 to the outer end 170b outside of the housing 152, so as to reduce the risk of electric shock via inadvertent contact with the energized test posts 170. FIGS. 5-7 illustrate further details of caps 200 according to some embodiments. The caps 200 may comprise an electrically non-conductive (or electrically insulating) material, such as, for instance a polymeric material (such as plastic), an elastomeric material (such as natural or synthetic rubber), or other electrically non-conductive materials.

Each cap 200 includes a central or longitudinal axis 205, a first end 200a (which also may be referred to herein as an "inner end" or "proximal end"), and a second end 200b (which also may be referred to herein as an "outer end" or "distal end") that is spaced from the first end 200a along the axis 205. In addition, a radially outer surface 200c extends axially along axis 205 between the ends 200a, 200b. The radially outer surface 200c may comprise any suitable shape. For instance, in the illustrated embodiment, the caps 200 may each comprise a polygonal cross-section and thus the radially outer surface 200c of each cap 200 may include a plurality of planar surfaces (or facets) 201 that extend axially between the ends 200a, 200b (FIGS. 5 and 6). In the embodiment illustrated in the Figures, the caps 200 each have a hexagonal cross-section and thus the radially outer surface 200c of each cap 200 includes a total of six facets 201 circumferentially arranged about the corresponding axis 205. In addition, as best shown in FIG. 5, a plurality of chamfered surfaces 209 may extend between the facets 201 and the planar outer end 200b on each cap 200. However, it should be appreciated that in other embodiments, the radially outer surface 200c of one or more of the caps 200 may comprise a cylindrical surface or another suitable shape or cross-section.

Each cap 200 may include an axial recess or chamber 204 that extends axially into the cap 200 from the inner end 200a along axis 205, and a bore 202 that extends axially from the recess 204 to the outer end 200b along axis 205. The bore 202 may form or define an opening 203 positioned on the outer end 200b of the cap 200. As shown in FIG. 6, the recess 204 comprises a cylindrical recess in some embodiments. Thus, the recess 204 of the embodiment illustrated in FIG. 6 includes a cylindrical inner surface 208 that extends circumferentially about axis 205 and axially from the inner end 200a. However, other shapes or cross-sections are contemplated for the recess 204 other than cylindrical (such as hexagonal, polygonal, square, rectangular, triangular, or other shapes).

The bore 202 may include internal threads such that the bore 202 may be referred to herein as a threaded bore 202. In addition, the recess 204 may have an inner diameter that is greater than an inner diameter of the threaded bore 202 (or conversely, the threaded bore 202 may have an inner diameter that is smaller than an inner diameter of the recess 204) so that a radially extending (relative to axis 205) annular shoulder 207 is formed or defined between the recess 204 (particularly the cylindrical surface 208) and the bore 202. Thus, the cap 200 may comprise a hollow member having a continuous internal passage 206 extending between ends 200a, 200b that is defined by the bore 202 and the recess 204.

As shown in FIGS. 4 and 7, caps 200 may be threaded onto (or threadably engaged with) the test posts 170 along the face plate 154 outside of the housing 152. Specifically, for each test post 170 and corresponding cap 200, the outer end 170b is received into the recess 204 from the inner end 200a of cap 200 so that the outer end 170b may threadably engage with the threaded bore 202. Thereafter, the cap 200 may be rotated about axis 205 so as to threadably advance the outer end 170b of test post 170 within the threaded bore 202 toward the outer end 200b of cap 200. The threaded advancement of the test post 170 within threaded bore 202 continues until the threaded nut 172 positioned along the face plate 154, outside of the housing 152 is received within the recess 204 and the inner end 200b of cap 200 is engaged or abutted with the face plate 154. The threaded nut 172 may have an outer diameter that is greater than the inner diameter of the bore 202, and thus may not be received within the bore 202 during operations. In some embodiments, the threaded nut 172 may engage with or abut the annular shoulder 207. Thus, the recess 204 may allow the cap 200 to cover the threaded nut 172 and thereby prevent (or at least reduce) electric shock due to contact with the threaded nut 172 by a technician during operations.

It should be appreciated that cap 200 may be engaged with the test post 170 in a manner other than a threaded connection via the bore 202 in other embodiments. For instance, in some embodiments, the internal passage 206 (including bore 202) may not include internal threads, and the bore 202 may slidingly receive the test post 170 in an axial direction along axis 205. The inner diameter of the bore 202 may be sized relative to an outer diameter of the test post 170 so that there is an interference or friction fit between the bore 202 and the test posts 170, and the cap 200 is secured to the test post 170 via a press-fit connection. Still other engagement types are contemplated between the cap 200 and the test post 170 in other embodiments, such as, for instance a push-pull connection or an adhesive.

Thus, once each test post 170 is fully covered by a cap 200 as shown in FIGS. 4 and 7, contact with the test post 170 outside of the housing 152 is prevented by the cap 200 except through the opening 203 into the threaded bore 202 at the outer end 200b of cap 200. The threaded bore 202 and opening 203 may be sized and configured (particularly with respect to the inner diameter of the bore 202) and opening 203 so that a technician may not be able to fit a finger into the bore 202 to contact the outer end 170b of test post 170 during operations.

In some embodiments, the caps 200 may be permanently or semi-permanently secured to the test posts 170. For instance, in some embodiments, the caps 200 may be permanently or semi-permanently secured to the test posts 170 via an adhesive and/or a mechanical connection assembly, such as a latch, and/or one or more screws, rivets, bolts, etc.

As shown in FIG. 7, an extended or projected length L170 of the test post may be measured from the face plate 154 to the outer end 170b, and the cap 200 may have a total axial length L200 measured along axis 205 between ends 200a, 200b. Thus, the projected length L170 may correspond to a length of the first (or distal portion) 174 of the test post 170. Because the cap 200 may entirely cover the portion of the test post 170 that extends outward from the face plate 154 as previously described, the axial length L200 of the cap 200 may be equal to or greater than the projected length L170 of the test post 170.

Figure 8:
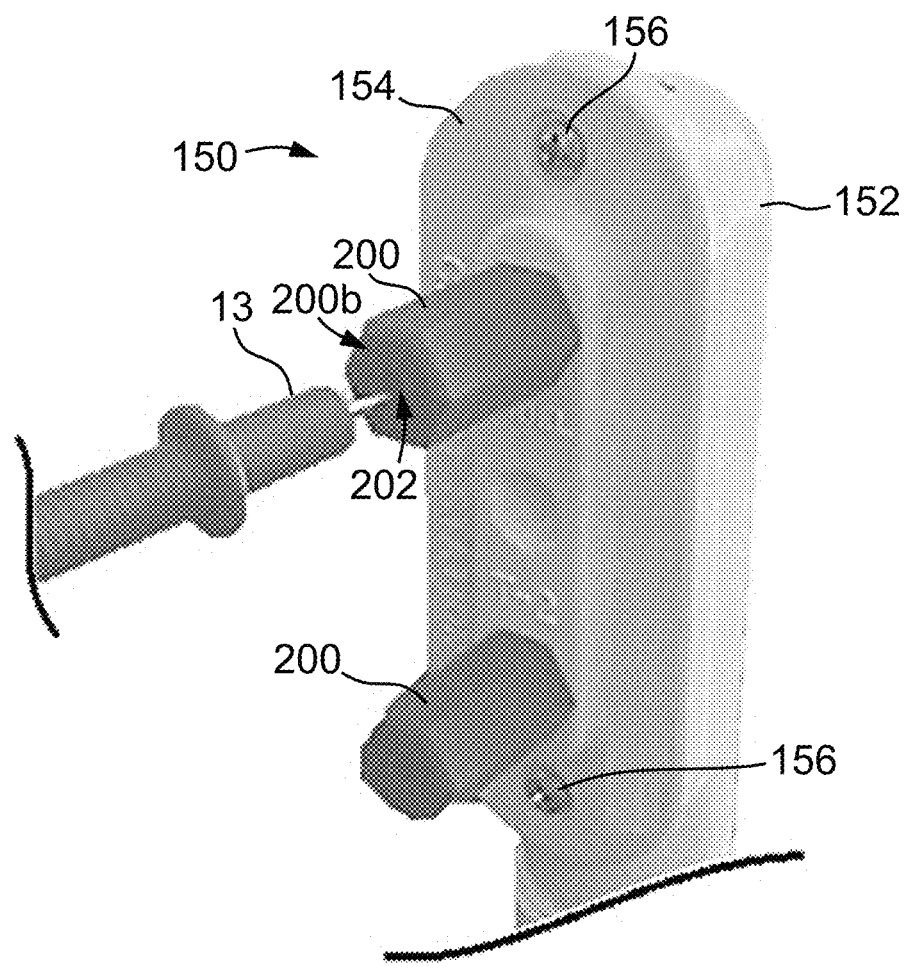
FIGS. 8 and 9 are perspective views of the test station assembly of FIG. 2 with a probe engaging a test post through an aperture or bore of the corresponding cap according to some embodiments of this disclosure.
Figure 9:
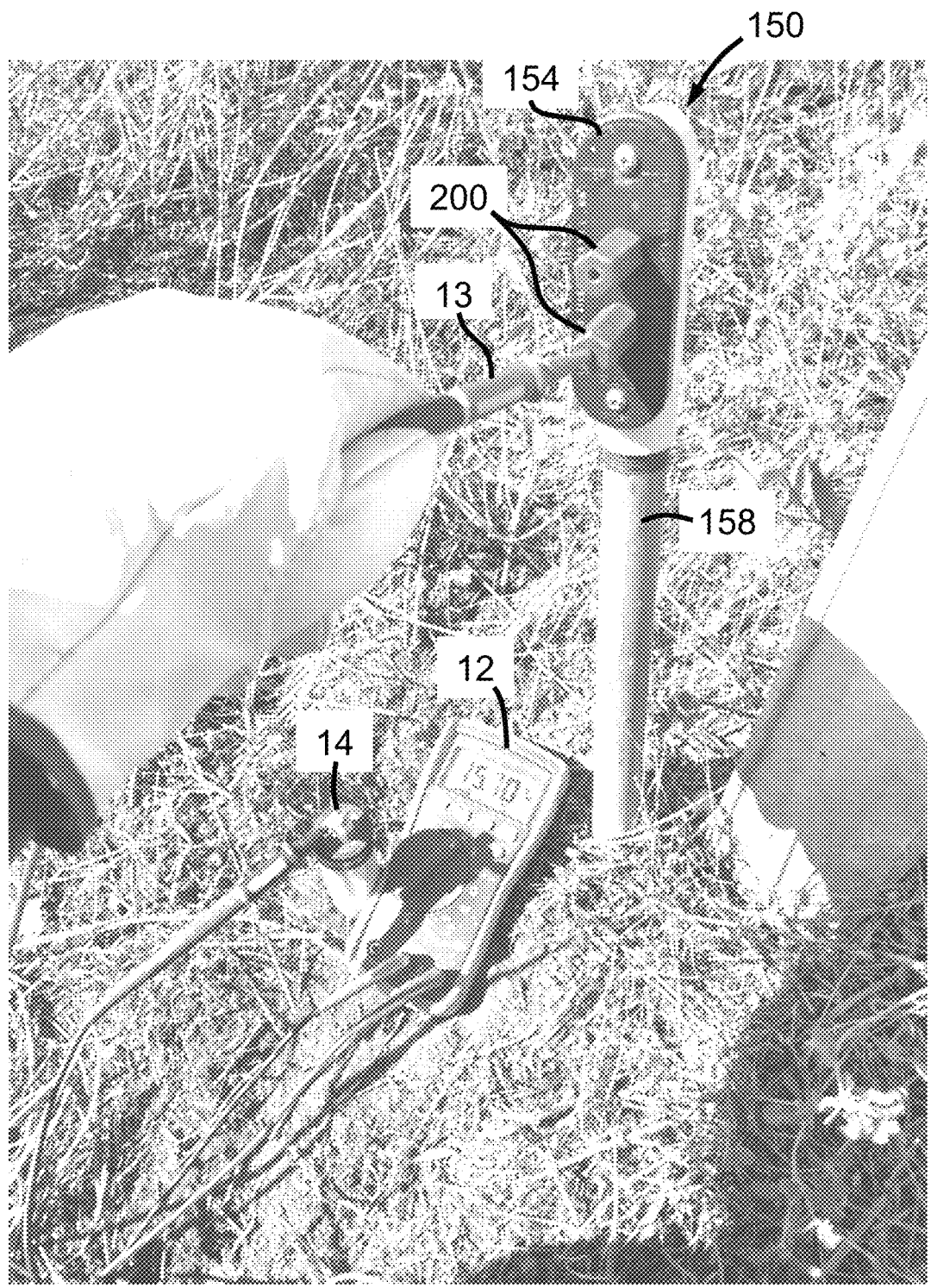

During operations, a technician may measure an electrical potential of one or more components of the cathodic protection monitoring assembly 3 (FIG. 1), such as the metallic coupon 120, reference electrode (not shown), structure 2, etc. As shown in FIGS. 4, 8, and 9, a technician may insert a probe 13 connected to a voltmeter 12 (or other suitable measurement device or assembly as previously described) into the threaded bore 202 via the opening 203 of a desired one of the caps 200 so that the probe 13 may contact the outer end 170*b* of test post 170 covered by the cap 200 (FIGS. 4 and 7). Once the probe 13 contacts the outer end 170*b* of test prost 170, electricity may be conducted between the test probe and the corresponding electrical conductor cable 151 via the test post 170 and corresponding connector 155. As shown in FIG. 9, in some embodiments, the voltmeter 12 may also be electrically connected to an additional probe or electrode 14 that is engaged with the ground 1 so as to measure a stable electrical ground so that voltmeter may determine an electrical potential difference (or voltage difference) between the electricity measured by the probe 13 via one of the test posts 170 and the stable electrical ground.

Figure 11:
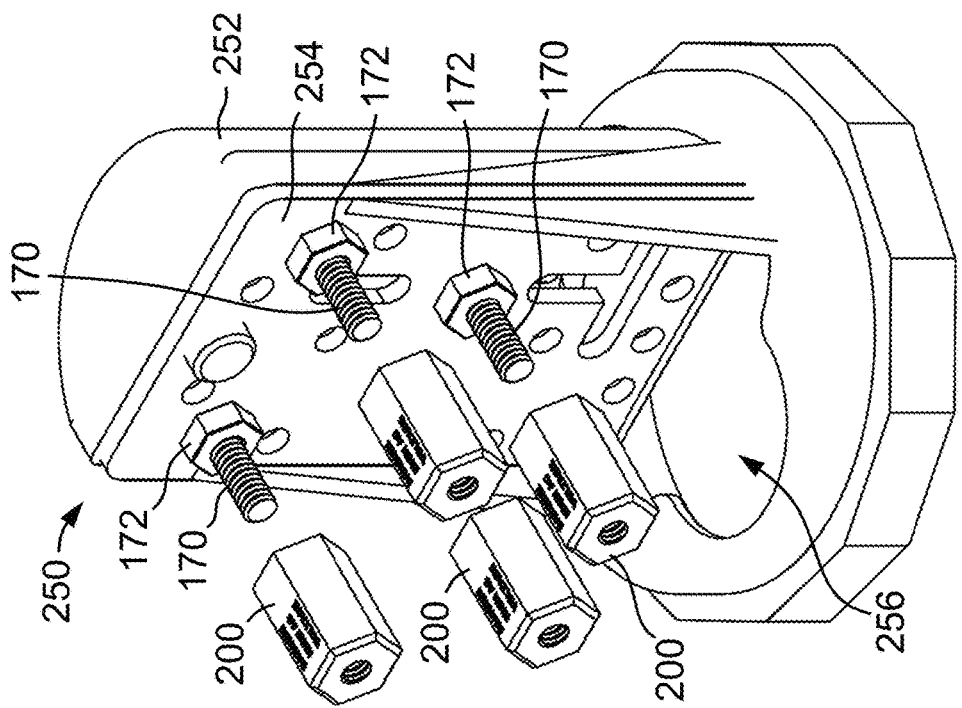
FIG. 11 is partially exploded view of the test station assembly of FIG. 10 showing the caps removed from the test posts according to some embodiments of this disclosure.
Figure 10:
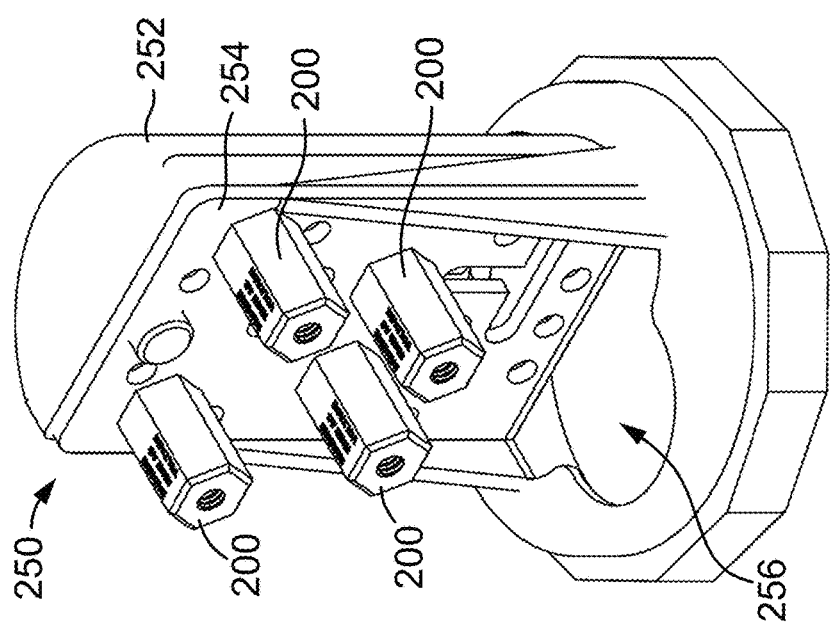
FIG. 10 is a perspective view of another test station assembly that may be used with the cathodic protection monitoring assembly of FIG. 1 including caps that cover one or more test posts of the test stion according to some embodiments of this disclosure.

While the test station assembly 150 described herein and shown in FIGS. 2 and 3 includes a pair of test posts 170, it should be appreciated that embodiments of test station assemblies that include different numbers of test posts (including less than two test posts 170 and more than two test posts 170) are contemplated herein. For instance, FIGS. 10 and 11 show a test station assembly 250 that may be used in place of the test station assembly 150 within the cathodic protection monitoring assembly 3 described herein (FIG. 1). The test station assembly 250 may include a housing 252 and face plate 254 in place of the housing 152 and face plate 154 of test station assembly 150 (FIGS. 2 and 3).

The face plate 254 may include and support four test posts 170. The increased number of test posts 170 may allow additional components (or portions of components) to be electrically connected to the test station assembly 250 for electrical potential monitoring as previously described herein. For instance, in some embodiments, additional electrical conductor cables (such as conductor cables 7, 8, 9, 151) may be connected to additional coupon assemblies 100 and/or other structures 2 or different portions or regions of a single structure 2 so as to allow for additional measurements to facilitate or support an assessment of a cathodic protection system during operations. Each of the test posts 170 may be secured to the face plate 254 via threaded nuts 172 in the same manner as previously described above for the test station assembly 150. In addition, each of the test posts 170 may be covered by a corresponding cap 200 in the same manner as previously described above for the test posts 170 of test station assembly 150.

The housing 252 may include an opening or aperture 256 adjacent the face plate 254 that may allow a technician access into the housing 252 independently of the face plate 254. Thus, a technician may utilize the aperture 256 to access and/or manipulate one or more electrical conductor cables (such as conductor cables 7, 8, 9, 151) that are connected to the test posts 170. The housing 252 may be engaged with and supported on a shaft or pole (such as pole 158 shown in FIGS. 2 and 3) as previously described above for test station assembly 150.

In some embodiments, the caps 200 may be color coded and/or may include labels to indicate which portion(s) of the structure (structure 2 shown in FIG. 1), the cathodic protection system (anode 4 shown in FIG. 1), and/or the coupon assembly (coupon assembly 100 shown in FIG. 1 including the test coupon 120 and/or the reference electrode—not shown) that the corresponding test posts 170 are electrically connected to. Thus, by color coding and/or labeling the caps 200, a technician may be more easily and efficiently conduct a monitoring operation using a test station assembly according to the embodiments disclosed herein (such as the test station assemblies 150, 250).

Figure 12:
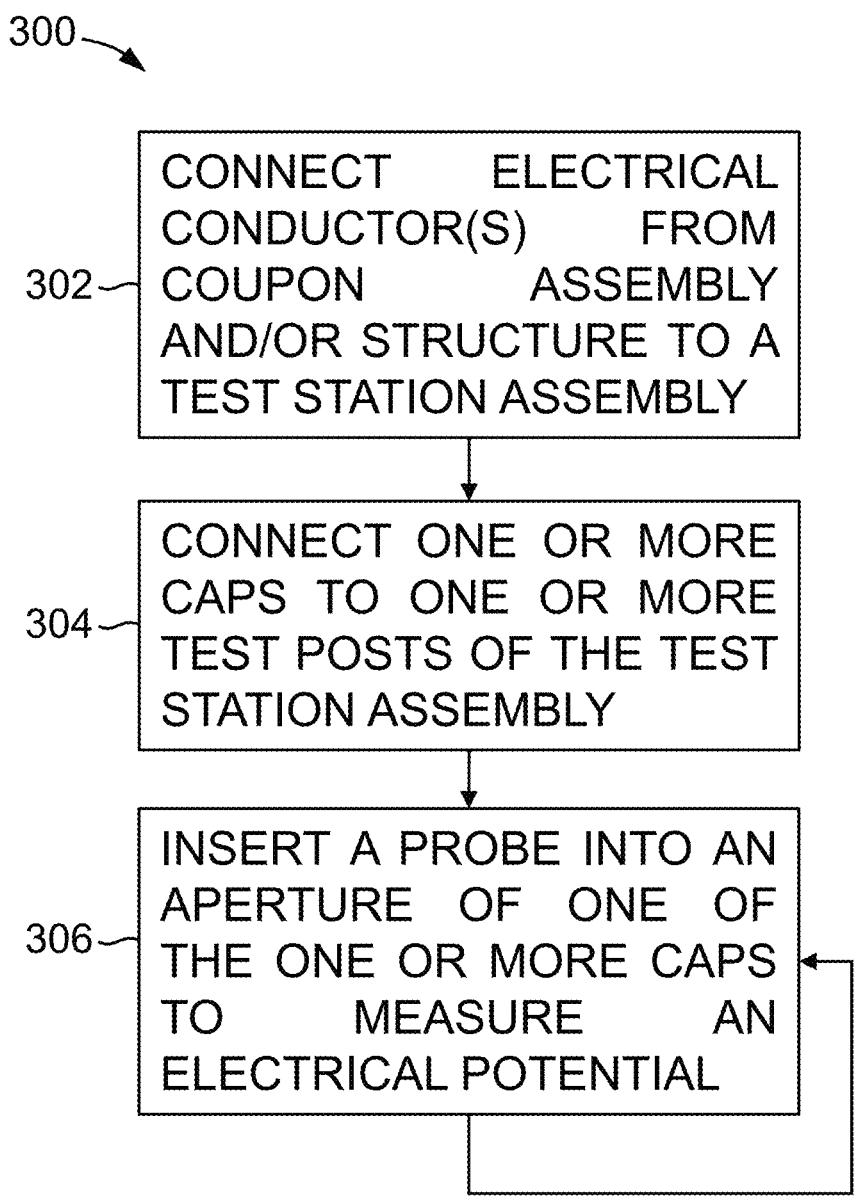
FIG. 12 is a block diagram of a method of assessing the effectiveness of a cathodic protection system for a buried or submerged structure according to some embodiments of this disclosure.

FIG. 12 illustrates a diagram of a method 300 of measuring an electrical potential of one or more components of a cathodic protection monitoring assembly. In describing the features of method 300, reference will be made to the cathodic protection monitoring assembly 3, including the test station assembly 150 or the test station assembly 250 and caps 200 shown in FIGS. 1-11 and described herein. However, it should be appreciated that method 300 may be practiced with systems and assemblies that are different from the cathodic protection monitoring assembly 3, test station assembly 150, test station assembly 250, and caps 200 previously described herein.

Initially, method 300 includes connecting electrical conductor from a coupon assembly and/or a buried or submerged structure to a test station assembly at block 302. For instance, as previously described for the cathodic protection monitoring assembly 3 and shown in FIGS. 1 and 4, the electrical conductors 7, 8, 9, 151 may be connected to the structure 2, and one or more components of the coupon assembly 100 (including metallic coupon 120 and reference electrode—not shown) in some embodiments. The electrical conductors 7, 8, 9, 151 may be electrically connected to one or more test posts 170 of the test station assembly 150 (or test station assembly 250) via suitable connectors 155 (FIG. 4).

In addition, method 300 includes connecting one or more caps to one or more test posts of the test station assembly at block 304. For instance, as previously described for the cathodic protection monitoring assembly 3 and shown in FIGS. 2, 3, 4, and 7, a cap 200 is engaged with each of the test post(s) 170 extending outward from the face plate 154 of the test station assembly 150 (or face plate 254 of test station assembly 250). Each cap 200 may cover a corresponding one of the test posts 170 so that inadvertent contact with the test posts 170 may be prevented. Because the cap(s) 200 may comprise an electrically non-conductive (or electrically insulative) material, the cap(s) 200 may reduce the risk of electrical shock due to contact (such as by a technician) with the electrically energized test post(s) 170. In some embodiment, method 300 may include replacing a face plate 154 on the housing 152 of the test station assembly 150 (or test station assembly 250) so as to retrofit an existing test station assembly to include suitable test posts 170 that may engage with the one or more caps 200 as described herein.

Further, method 300 includes inserting a probe into an aperture (or opening) of one of the one or more caps to measure an electrical potential at block 306. For instance, as previously described for the cathodic protection monitoring assembly 3 and shown in FIGS. 4, 8, and 9, a technician may insert a probe 13 into the opening 203 and bore 202 of one of the caps 200 at the outer end 200*b* thereof so that the probe 13 may engage with the outer end 170*b* of the corresponding test post 170. As previously described, once the probe 13 is engaged with the test post 170 via the bore 202 of the cap 200, a voltmeter 12 (or other suitable measurement device or assembly) may determine an electrical potential (or voltage) associated with the test post 170 and the one or more components of the cathodic protection monitoring assembly 3 connected to the test probe 170 via the corresponding electrical conductor (such as one of the electrical conductors 7, 8, 9, 151 previously described).

Figure 13:
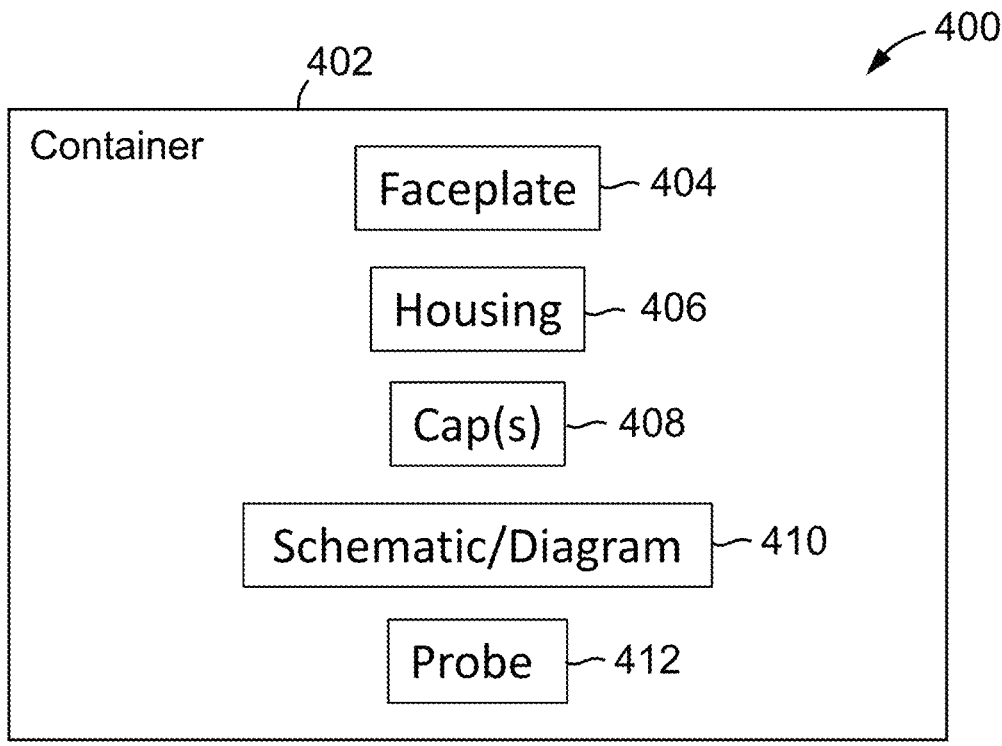
FIGS. 13-15 are schematic diagrams of a kit to provide enhanced monitoring at a test station assembly of a cathodic protection system of a buried or submerged structure according to some embodiments of this disclosure.

As is illustrated in FIG. 13, in some embodiments block 306 may be repeated a number of times so that an electrical potential (or voltage) may be measured at some or all of the test posts of the test station assembly. Specifically, with respect to the cathodic protection monitoring assembly 3 previously described herein and shown in FIGS. 1, 10, and 11, the test station assembly 150 (or test station assembly 250) may include a plurality of test posts 170 that are connected to a plurality of different components of the assembly 3 (such as the structure 2, metallic coupon 120, reference electrode—not shown, etc.). Thus, a technician may measure an electrical potential for each of the test posts 170 in order to make or support an assessment of the effectiveness of the cathodic protection for the structure 2 during operations. Thus, the technician may insert a suitable probe (such as probe 13) into the apertures or bores 202 of each of the caps 200 so as to facilitate measurement of the electric potential at each (or some) of the test posts 170 of the test station assembly 150 (or test station assembly 250) during operations.

Figure 14:
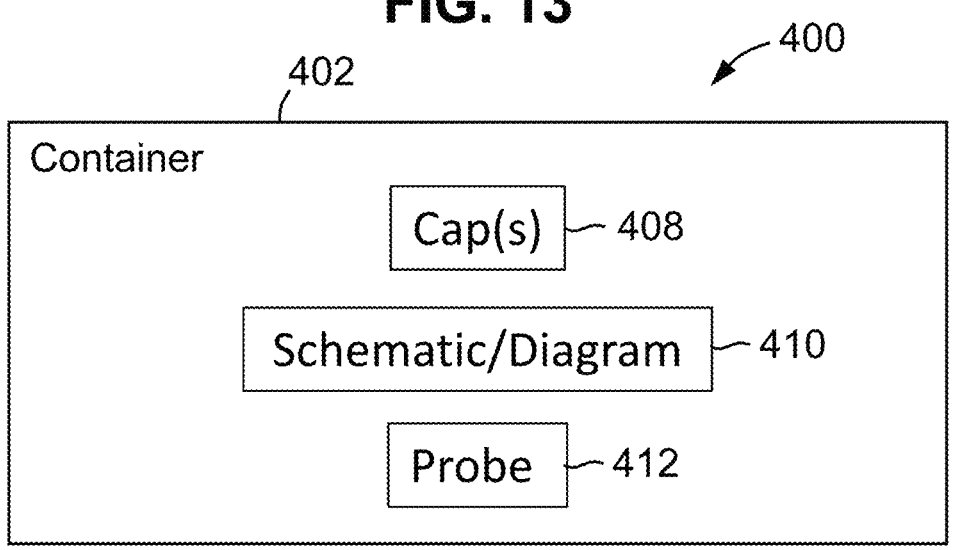

As shown in FIGS. 13 and 14, in some embodiments, one or more components of the test station assembly 150 (or test station assembly 250) may be transported to and about a worksite (such as the site associated with the buried or submerged structure 2 shown in FIG. 1) in a container 402 as a single kit 400 or assembly. In some embodiments, the kit 400 may facilitate the assessment or monitoring of a cathodic protection system for a buried or submerged structure (such as structure 2 previously described).

As shown in FIG. 13, in some embodiments, the kit 400 may include the components of a test station assembly (such as test station assembly 150 or test station assembly 250 described herein) such that the kit 400 may be used for the installation (or partial or entire replacement) of a test station assembly for a cathodic protection monitoring assembly (such as assembly 3 described herein). Thus, in some embodiments, the kit 400 may include a face plate 404, housing 406, and one or more caps 408 positioned within the container 402, wherein the face plate 404, housing 406, and cap(s) 408 may be the same or similar to one or more of the face plates 154, 254, housings 152, 252, and caps 200 previously described herein. In some embodiments, the face plate 404 may include one or more test posts (such as test posts 170) connected thereto. Alternatively, the test posts (such as test posts 170) may be separately inserted within container 402 so that at technician may install the one or more test posts onto the face plate 404 as previously described herein. In addition, in some embodiments, the housing 406 and the face plate 404 (with or without the test posts connected thereto) may be connected to one another as a single component when positioned within the container 402, or (alternatively) may be separately positioned (as separate components) within the container 402.

As is also shown in FIG. 13, in some embodiments, the kit 400 may also include additional components to facilitate installation and/or use of the test station assembly. For instance, in some embodiments, the container 402 of the kit 400 may also include a schematic or diagram 410 for installing or assembling the test station assembly (or a component thereof) and/or a probe 412 that may be configured to be connected to a suitable voltmeter (such as voltmeter 12 previously described) or another suitable measurement device and configured to be inserted within an aperture or opening (such as bore 202 and opening 203) of the one or more caps 408 to facilitate electrical potential or voltage measurement using the test station assembly as previously described herein. The probe 412 may be the same or similar to the probe 13 previously described herein.

Figure 15:
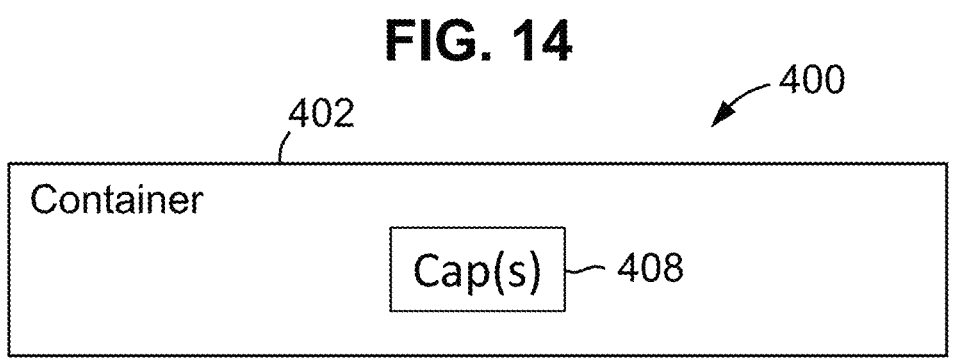

As shown in FIGS. 14 and 15, in some embodiments, different combinations of components may be included within the kit 400 (and container 402) than those shown in FIG. 13. For instance, in some embodiments, the kit 400 may include fewer components (or additional components) to those shown in FIG. 13. In one particular example, the embodiment shown in FIG. 14 illustrates the kit 400 including the cap(s) 408, the schematic/diagram 410, and the probe 412. In another particular example, the embodiment shown in FIG. 15 illustrates the kit 400 including the cap(s) 408 within the container 402. However, it should be appreciated that other combinations of components are contemplated for the kit 400 in other embodiments.

The embodiments disclosed herein are directed to test station assemblies including one or more electrically energized test posts and nonconductive caps positioned over the test posts so as to protect personnel (or passersby) from the risk of electric shock (due to inadvertent contacting with the test posts) but while still allowing personnel to access the test posts during a survey of the cathodic protection system without removing or disturbing the caps. Thus, through use of the embodiments disclosed herein, the risk of electric shock due to inadvertent contact with the leads or terminals of a test station assembly for a cathodic protection monitoring assembly may be reduced.

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion herein and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like, when used in reference to a stated value mean within a range of plus or minus 10% of the stated value.

The present application claims priority to and the benefit of U.S. Provisional Application No. 63/466,056, filed May 12, 2023, titled "TEST STATION ASSEMBLIES FOR MONITORING CATHODIC PROTECTION OF STRUCTURES AND RELATED METHODS," U.S. Provisional Application No. 63/466,062, filed May 12, 2023, titled "TEST STATION ASSEMBLIES FOR MONITORING CATHODIC PROTECTION OF STRUCTURES AND RELATED METHODS," and U.S. Provisional Application No. 63/513,391, filed Jul. 13, 2023, titled "ELECTRODE WATERING ASSEMBLIES AND METHODS FOR MAINTAINING CATHODICMONITORING OF STRUCTURES," the disclosures of each of which are incorporated herein by reference in their entireties. The present application is also a continuation-in-part of U.S. Non-Provisional application Ser. No. 17/886,178, filed Aug. 11, 2022, titled "ASSEMBLIES AND METHODS FOR MONITORING CATHODIC PROTECTION OF STRUCTURES," which is a divisional of U.S. Non-Provisional application Ser. No. 17/805,801, filed Jun. 7, 2022, titled "ASSEMBLIES AND METHODS FOR MONITORING CATHODIC PROTECTION OF STRUCTURES," now U.S. Pat. No. 11,447,877, issued Sep. 20, 2022, which claims priority to and the benefit of U.S. Provisional Application No. 63/365,102, filed May 20, 2022, titled "ASSEMBLIES AND METHODS FOR MONITORING CATHODIC PROTECTION OF STRUCTURES," and U.S. Provisional Application No. 63/260,622, filed Aug. 26, 2021, titled "MINIATURE IR ERROR-FREE CATHODIC PROTECTION COUPON ASSEMBLY INSTALLED VIA PROBE," the disclosures of each of which are incorporated herein by reference in their entireties.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A cathodic protection test station assembly for monitoring a cathodic protection system of an at least partially buried or submerged structure, the cathodic protection test station assembly comprising:
   a housing at least partially defining an inner chamber, the housing including a connector and an opening;
   a pole configured to connect to the connector of the housing such that an electrical conductor extending through the pole is configured to enter into the inner chamber via the connector, the electrical conductor configured to be connected to a coupon assembly buried or submerged proximate the structure;
   a face plate configured to attach to the housing to at least partially cover the opening of the housing;
   an electrically conductive test post configured to connect to the face plate such that a first end portion of the test post is to connect to the electrical conductor in the inner chamber of the housing and a second end portion of the test post is to extend away from the face plate outside of the inner chamber; and
   a cap comprising a non-conductive material that is configured to cover the test post outside of the inner chamber, the cap including: (a) an internal passage configured to receive the test post therein, the internal passage including a recess extending from a first end portion of the cap and a bore extending from the recess to a second end portion of the cap along a longitudinal axis thereof, and the bore having an inner diameter smaller than an inner diameter of the recess, and (b) an opening into the bore of the internal passage configured to receive a probe of a voltmeter therethrough to contact the test post, thereby to facilitate measurement of voltage detected by the coupon assembly corresponding to one or more of a voltage of the structure and the coupon assembly.

2. The assembly of claim 1, wherein the bore comprises a threaded bore.

3. The assembly of claim 2, wherein the test post is configured to connect to the face plate via a threaded nut, and
   wherein, when the cap connects to the test post, the threaded nut is at least partially received within the recess of the cap and at least a portion of the test post is threadably received within the threaded bore such that the probe inserted into the opening contacts the second end portion of the test post to measure the voltage.

4. The assembly of claim 1, wherein the second end portion of the cap is configured to engage the face plate when the cap covers the test post outside of the inner chamber.

5. The assembly of claim 1, wherein the cap has a length along the longitudinal axis of the cap that is equal to or greater than a projected length of the test post measured from the face plate to the second end portion of the test post.

6. The assembly of claim 1, wherein the cap comprises a polygonal cross section such that an outer surface of the cap includes a plurality of facets extending axially relative to the longitudinal axis.

7. The assembly of claim 6, wherein the recess includes a cylindrical inner surface.

8. The assembly of claim 1, wherein the cap comprises one or more of (a) a polymeric material or (b) a non-metallic material.

9. The assembly of claim 1, wherein the electrical conductor comprises a conductive wire and a non-conductive jacket positioned to circumferentially surround the conductive wire.

10. The assembly of claim 1, wherein the recess is positioned to receive a connection member engaged with the test post.

11. The assembly of claim 10, wherein the connection member has an outer diameter larger than an inner diameter of the bore.

12. A cathodic protection test station assembly for monitoring a cathodic protection system of a buried or submerged structure, the cathodic protection test station assembly comprising:
   a non-conductive housing configured to connect to a shaft including a first electrical conductor and a second electrical conductor, the first electrical conductor and the second electrical conductor connected to a coupon assembly buried or submerged proximate the structure;
   an electrically conductive test post (a) including a proximal end portion connected to the electrical conductor and a distal end portion and (b) configured to connect to the housing such that the distal end portion extends outwardly from the housing and the proximal end portion substantially resides within the housing;

a second electrically conductive test post (a) including a second proximal end portion connected to the second electrical conductor and a second distal end portion and (b) configured to connect to the housing such that the second distal end portion extends outwardly from the housing and the second proximal end portion substantially resides within the housing; and a cap comprising a non-conductive material and an opening, the cap configured to (a) connect to and substantially surround the test post without substantially surrounding the second test post and (b) enable a probe to contact the test post via the opening to facilitate measurement of voltage detected by the coupon assembly.

13. The assembly of claim 12, wherein the cap connects to the test post via one of a press-fit connection, a threaded connection, a push-pull connection, or an adhesive.

14. The assembly of claim 12, wherein the test post is connected to a cathodic protection system and an electrically conductive test coupon via the first electrical conductor, and wherein the second test post connects to a reference electrode via the second electrical conductor.

15. The assembly of claim 12, wherein the non-conductive material has an inner surface positioned to physically contact an outer surface of the test post.

16. A method of installing a cathodic protection monitoring assembly to monitor cathodic protection of an at least partially buried structure or submerged structure, the method comprising:

connecting an electrical conductor from a coupon assembly to a conductive test post of a test station assembly, the coupon assembly including an electrically conductive test coupon and a reference electrode, the test post extending outward from a housing of the test station assembly;

connecting a cap to the test post;

covering the test post with the cap as a result of the connecting, the covering comprising (i) receiving the test post into a bore of the cap and (ii) receiving a threaded nut engaged with the test post into a recess extending from the bore of the cap to an end portion of the cap, the recess having an inner diameter that is larger than an inner diameter of the bore; and exposing the test post through an opening in the cap to facilitate measurement of voltages detected by the coupon assembly.

17. The method of claim 16, further comprising inserting a probe into the opening of the cap to contact the test post.

18. The method of claim 16, wherein connecting the cap to the test post comprises threading the cap onto the test post.

19. The method of claim 16, further comprising preventing physical contact between personnel and the test post as a result of the connecting and the covering.

* * * * *